(12) United States Patent
Pinto et al.

(10) Patent No.: US 8,165,853 B2
(45) Date of Patent: Apr. 24, 2012

(54) DIMENSION REDUCTION IN PREDICTIVE MODEL DEVELOPMENT

(75) Inventors: Stephen K. Pinto, Newton, MA (US); Richard Mansfield, Cambridge, MA (US); Donald Rubin, Newton, MA (US)

(73) Assignee: KnowledgeBase Marketing, Inc., Richardson, TX (US)

( * ) Notice: Subject to any disclaimer, the term of this patent is extended or adjusted under 35 U.S.C. 154(b) by 472 days.

(21) Appl. No.: 10/826,949

(22) Filed: Apr. 16, 2004

(65) Prior Publication Data

US 2005/0234762 A1 Oct. 20, 2005

(51) Int. Cl.
*G06G 7/60* (2006.01)

(52) U.S. Cl. .................... 703/2; 703/6; 705/38; 700/44; 700/97

(58) Field of Classification Search .................... 705/10, 705/7, 38; 700/97, 44; 703/2, 6
See application file for complete search history.

(56) References Cited

U.S. PATENT DOCUMENTS

| | | |
|---|---|---|
| 5,479,523 A | 12/1995 | Gaborski et al. |
| 5,491,629 A | 2/1996 | Fox et al. |
| 5,544,281 A | 8/1996 | Maruoka et al. |
| 5,583,763 A | 12/1996 | Atcheson et al. |
| 5,592,560 A | 1/1997 | Deaton et al. |
| 5,608,620 A | 3/1997 | Lundgren |
| 5,621,812 A | 4/1997 | Deaton et al. |
| 5,659,593 A | 8/1997 | Tzvieli |
| 5,692,107 A | 11/1997 | Simoudis et al. |
| 5,701,400 A | 12/1997 | Amado |
| 5,826,250 A | 10/1998 | Trefler |
| 6,026,397 A | 2/2000 | Sheppard |
| 6,185,543 B1 | 2/2001 | Galperin et al. |
| 6,243,696 B1 | 6/2001 | Keeler et al. |
| 6,269,325 B1 | 7/2001 | Lee et al. |
| 6,301,471 B1 | 10/2001 | Dahm et al. |
| 6,317,752 B1 | 11/2001 | Lee et al. |

(Continued)

FOREIGN PATENT DOCUMENTS

| | | |
|---|---|---|
| CA | 2241119 | 3/2002 |
| EP | 1 085 429 A1 * | 3/2001 |
| WO | WO 99/22328 | 5/1999 |
| WO | WO 02/19061 | 3/2002 |
| WO | WO 03/005232 | 1/2003 |
| WO | PCT/US05/11749 | 2/2006 |

OTHER PUBLICATIONS

C Bounsaythip, E Rinta-Runsala "Overview of Data Mining for Customer Behavior Modeling"—Finland: VTT Information Technology, Research Report TTE1-18, 2001.*

(Continued)

*Primary Examiner* — Kakali Chaki
*Assistant Examiner* — Tejal Gami
(74) *Attorney, Agent, or Firm* — Fish & Richardson P.C.

(57) ABSTRACT

Models are generated using a variety of tools and features of a model generation platform. For example, in connection with a project in which a user generates a predictive model based on historical data about a system being modeled, the user is provided through a graphical user interface a structured sequence of model generation activities to be followed, the sequence including dimension reduction, model generation, model process validation, and model re-generation.

Historical multi-dimensional data is received representing multiple variables to be used as an input to a predictive model of a commercial system variables are pruned for which the data is sparse or missing, and the population of variables is adjusted to represent main effects exhibited by the data and interaction and non-linear effects exhibited by the data.

18 Claims, 32 Drawing Sheets

U.S. PATENT DOCUMENTS

| | | | |
|---|---|---|---|
| 6,321,205 | B1 | 11/2001 | Eder |
| 6,338,066 | B1 | 1/2002 | Martin et al. |
| 6,381,504 | B1 | 4/2002 | Havener et al. |
| 6,430,539 | B1 | 8/2002 | Lazarus et al. |
| 6,523,015 | B1 | 2/2003 | Bera et al. |
| 6,542,894 | B1 | 4/2003 | Lee et al. |
| 6,556,977 | B1 | 4/2003 | Lapointe et al. |
| 6,567,812 | B1 | 5/2003 | Garrecht et al. |
| 6,611,726 | B1 | 8/2003 | Crosswhite |
| 6,631,360 | B1 | 10/2003 | Cook |
| 6,636,862 | B2 | 10/2003 | Lundahl et al. |
| 6,640,215 | B1 | 10/2003 | Galperin et al. |
| 6,684,208 | B2 | 1/2004 | Kil et al. |
| 6,687,696 | B2 * | 2/2004 | Hofmann et al. ............ 707/6 |
| 6,782,390 | B2 | 8/2004 | Lee et al. |
| 6,807,535 | B2 | 10/2004 | Goodkovsky |
| 6,820,070 | B2 | 11/2004 | Goldman et al. |
| 6,834,266 | B2 | 12/2004 | Kumar et al. |
| 6,836,773 | B2 | 12/2004 | Tamayo et al. |
| 6,839,682 | B1 | 1/2005 | Blume et al. |
| 6,859,529 | B2 | 2/2005 | Duncan et al. ............ 279/266.1 |
| 6,879,971 | B1 | 4/2005 | Keeler et al. |
| 6,882,977 | B1 | 4/2005 | Miller |
| 6,952,688 | B1 | 10/2005 | Goldman et al. |
| 6,954,758 | B1 | 10/2005 | O'Flaherty |
| 6,956,941 | B1 | 10/2005 | Duncan et al. ............ 379/265.01 |
| 7,035,855 | B1 | 4/2006 | Kilger et al. |
| 7,043,461 | B2 | 5/2006 | Kedher et al. |
| 7,047,251 | B2 | 5/2006 | Reed et al. |
| 7,349,827 | B1 | 3/2008 | Heller et al. |
| 7,499,897 | B2 | 3/2009 | Pinto et al. |
| 7,562,058 | B2 | 7/2009 | Pinto et al. |
| 7,725,300 | B2 | 5/2010 | Pinto et al. |
| 7,730,003 | B2 | 6/2010 | Pinto et al. |
| 7,933,762 | B2 | 4/2011 | Pinto et al. |
| 2002/0052836 | A1 | 5/2002 | Galperin et al. |
| 2002/0052858 | A1 | 5/2002 | Goldman et al. |
| 2002/0123923 | A1 | 9/2002 | Manganaris et al. |
| 2002/0127529 | A1* | 9/2002 | Cassuto et al. ............ 434/335 |
| 2003/0004777 | A1 | 1/2003 | Phillips |
| 2003/0004781 | A1 | 1/2003 | Mallon et al. |
| 2003/0018601 | A1 | 1/2003 | Lee et al. |
| 2003/0088565 | A1 | 5/2003 | Walter et al. |
| 2003/0154442 | A1 | 8/2003 | Papierniak |
| 2003/0171829 | A1 | 9/2003 | Fisher et al. |
| 2003/0176931 | A1 | 9/2003 | Pednault et al. |
| 2003/0212678 | A1 | 11/2003 | Bloom et al. |
| 2003/0220860 | A1 | 11/2003 | Heytens et al. |
| 2004/0002833 | A1 | 1/2004 | Tang et al. |
| 2004/0030667 | A1 | 2/2004 | Xu et al. |
| 2004/0111314 | A1 | 6/2004 | Cavaretta |
| 2004/0215599 | A1 | 10/2004 | Apps et al. |
| 2005/0004786 | A1 | 1/2005 | Thomason |
| 2005/0089768 | A1 | 4/2005 | Tanaka et al. |
| 2005/0096950 | A1* | 5/2005 | Caplan et al. ............ 705/7 |
| 2005/0234688 | A1 | 10/2005 | Pinto et al. |
| 2005/0234753 | A1 | 10/2005 | Pinto et al. |
| 2005/0234760 | A1 | 10/2005 | Pinto et al. |
| 2005/0234761 | A1 | 10/2005 | Pinto et al. |
| 2005/0234763 | A1 | 10/2005 | Pinto et al. |
| 2006/0161403 | A1* | 7/2006 | Jiang et al. ............ 703/2 |
| 2006/0241923 | A1 | 10/2006 | Xu et al. |
| 2010/0010878 | A1 | 1/2010 | Pinto et al. |
| 2011/0071956 | A1 | 3/2011 | Pinto et al. |

OTHER PUBLICATIONS

Harrison, H.C., "An Intelligent Business Forecasting System," ACM May 1993, pp. 229-236.

Haughton et al., "A Review of Software Packages for Data Mining," The American Statistician, Nov. 2003, vol. 57, No. 5, pp. 290-309.

Angus, Enterprise Miner 5.1 Digs Into Data, InforWorld, Aug. 9, 2004, vol. 26, No. 32, pp. 22-23.

Chapman et al., CRISP-DM 1.0 Step-by-Step Data Mining Guide, Aug. 2000, pp. 27-31, 53-59, 71-79.

Cabena et al., Intelligent Miner for Data Applications Guide, IBM Redbook, SG24-5252-00, Mar. 1999, pp. 9-17, 27-35, 69-77, 87-108, 111-128.

Schikora et al., Efficacy of End-User Neural Network and Data Mining Software for Predicting Complex System Performance, International Journal of Production Economics, vol. 84, pp. 231-253, Jun. 2003.

Bhattacharyya, Evolutionary Algorithms in Data Mining: Multi-Objective Performance Modeling for Direct Marketing, Proceedings of the Sixth ACM SIGKDD International Conference on Knowledge Discovery and Data Mining, pp. 465-473, Aug. 2000.

Pearce et al., Experimentation and Self Learning in Continuous Database Marketing, IEEE International Conference on Data Mining, pp. 775-778, Dec. 2002.

Etzion et al., e-CLV: A Modeling Approach for Customer Lifetime Evaluation in e-Commerce Domains, With an Application and Case Study for Online Auctions, IEEE International Conference on e-Technology, e-Commerce and e-Service, pp. 149-156, Mar. 2004.

Commercial software: SPSS Clementine: www.spss.com/Clementine/index.html.

"On-line Seminar: How to keep customers and increase profits using predictive analytics powered by Clementine", www.spss.com/spssbi/directresponse/clementinewebinar/index.cfm?dcode=d4183.

"SAS Enterprise Miner", www.sas.com/technologies/analytics/datamining/miner.

SAS JMP. www.jmp.com.

Clifford C. Clogg, et al., "Multiple Imputation of Industry and Occupation Codes in Census Public-Use Samples Using Bayesian Logistic Regression", *Journal of the American Statistical Association*, vol. 86, No. 413, pp. 68-78 (Mar. 1991).

Roderick J.A. Little et al., *Statistical Analysis with Missing Data ($2^{nd}$ Edition)*, John J. Wiley & Sons, Inc., (2002), pp. 19-22; 166-188; and 292-309.

Donald B. Rubin, "Using Empirical Bayes Techniques in the Law School Validity Studies", *Journal of the American Statistical Association*, vol. 75, No. 372, pp. 801-816 (Dec. 1980).

Declaration filed in related U.S. Appl. No. 10/826,947, filed Apr. 16, 2004 along with claim chart.

U.S. Appl. No. 10/826,950, filed Apr. 16, 2004.

U.S. Appl. No. 10/826,453, filed Apr. 16, 2004.

Tashman, "Automatic Forecasting Software: A Survey and Evaluation," *International Journal of Forecasting*, 7(2) (1991).

Wang et al., "An Expert System for Forecasting Model Selection," *IEEE* (1992).

New technology Card News, 10(6) (Apr. 3, 1995).

Pinto, "Smart Data Use Can Improve Bank Insurance Marketing National Underwriter," 106(20) (Jul. 2002).

Autobox 5.0 for Windows—User's Guide, *Automatic Forecasting Systems, Inc.* (Dec. 10, 1999).

SmartSoftware Web Pages (www.smartcorp.com), *Smart Software Inc.*, (Jul. 2001) (Retrieved from Archive.org Dec. 20, 2005).

ForecastPro Product Brochure (www.forecastpro.com), *Business Forecasting Systems* (2000), (Retrieved from Archive.org Dec. 20, 2005).

U.S. Appl. No. 10/826,711, filed Apr. 16, 2004.

U.S. Appl. No. 10/826,452, filed Apr. 16, 2004.

U.S. Appl. No. 10/826,624, filed Apr. 16, 2004.

U.S. Appl. No. 10/826,630, filed Apr. 16, 2004.

International Preliminary Report on Patentability for App. Ser. No. PCT/US05/11749, dated Nov. 29, 2006, 8 pages.

Application, pending claims for U.S. Appl. No. 12/787,956, filed May 26, 2010.

Pinto, "Using Customer Data to Dramatically Improve Marketing ROI," Fortelligent Whitepaper, 3 pages (2002).

Pinto, "New Marketing Technologies for a World of Product Proliferation," Fortelligent Inc., Whitepaper, 2 pages (2002).

U.S. Appl. No. 12/564,998, filed Sep. 23, 2009.

U.S. Appl. No. 12/787,956, filed May 26, 2010.

U.S. Appl. No. 10/826,947, filed Apr. 16, 2004.

* cited by examiner 50
52

ModelProperty Table

| Field Name | Data Type | Description |
|---|---|---|
| ProjectID | AutoNumber | Unique Number Indexing Model Projects |
| ProjectName — 54 | Text | Reference Name for Model Project |
| ProjectType | Text | Type of Model to be constructed (Response, Clone, Suppression, ....) |
| ProjectGoal — 56 | Text | Analyst-defined goal for current Model Project |
| ProjectBeginDate | Date/Time | Identifying Time Stamp for first use |
| ProjectEndDate | Date/Time | Last used Time Stamp |
| ProjectDataset — 58, 60 | Text | Full pathname reference to Development dataset |
| ProjectDataDictionary | Text | Full pathname reference to metadata and Model status and date |
| ProjectLog | Text | Full pathname reference to log of Analyst decisions |
| DependentVariable — 62 | Text | Target variable selected for Model |
| ModelFitnessCriterion | Number | Desired c-index for Model set by Analyst |
| ModelPerformanceCriterion | Number | Desired zone of positive Model Gain set by Client |
| ModelPerformanceMonotonicityCriterion | Number | Desired level of Monotonicity |
| DevelopmentDatasetSize | Number | Total number of records in Development Dataset |
| PositiveOutcomes(%) | Number | Number of successful outcomes as a percent of Development Dataset Size |
| SampleSize(%) | Number | Size of Training Sample as a percent of total Development Dataset Size used for Candidate Model |
| VariableCount | Number | Initial Number of Predictor Variables |
| SampleDistribution | Hyperlink | Distribution of Predictor Variables: Graphs and Statistics |
| SampleByDistribution | Hyperlink | Distribution of Predictor Variables for Positive and Negative Outcomes |
| InteractionTree | Hyperlink | Cross-validated Partition Tree for Key Predictor Variables |
| DimensionReductionMissingFilter | Number | Number of Predictor Variables Eliminated for Missing Variables |
| DimensionReductionCutoff | Number | Cutoff set by Analyst for Percent of Missing Values Acceptable |
| DimensionReductionMainEffects | Number | Number of Predictor Variables Retained for Main Effects |
| DimensionReductionMainEffectsCutoff | Number | Cutoff set by Analyst for Significance of Main Effects |
| DimensionReductionInteractionEffects | Number | Number of Predictor Variables Retained for Interaction Effects |
| DimensionReductionInteractionEffectsCutoff | Number | Cutoff set by Analyst for Significance of Interaction Effects |
| DimensionReductionVariableCount | Number | Number of Predictor Variables resulting from Dimension Reduction |
| CandidateModelChoice | Text | Model Type applied to Dimension Reduced Dataset |
| CandidateModelChoiceConstraint | Number | Retention Cutoff or Significance Level for Model Variables |
| CandidateModelResults | Hyperlink | Model Fitting Results |
| CandidateModelLiftChart | Hyperlink | Model Non-cumulative Lift Chart |
| CandidateModelPersistenceChart | Hyperlink | Model Persistence Chart for Key Variables |
| ValidationMethod | Text | Method Selected for Model Development Process Validation |
| ValidationMethodResults | Hyperlink | Model Application to Validation Dataset(s) Results |
| ValidationMethodLiftChart | Hyperlink | Model Validation Lift Chart |
| FinalModelResults | Hyperlink | Model Development Process applied to Full Development Dataset Results |
| FinalModelLiftChartComparison | Hyperlink | Final Model applied to Sample and Validation Datasets for Cumulative Lift |
| FinalModelNonCumulativeLiftChartComparison | Hyperlink | Final Model applied to Sample and Validation Datasets for Non-cumulative Lift |
| FinalModelEquation | Text | Model Parameterized Equation using Model Transformed Variables |
| ScoringDataset | Text | Full pathname reference to Scoring File Input Dataset |
| DevelopmentScoringComparison | Hyperlink | Key Variable Comparison on Decile Basis |
| DevelopmentScoringDistributionComparison | Hyperlink | Propensity Score Distribution for Development and Scoring File (Subset) |
| ScoredResults | Text | Full pathname reference to Scoring File Output Dataset |
| InsightProfileMethod | Text | Method for Ranking Customer Insight Variables |
| InsightProfile | Hyperlink | Ranked List of Key Variables |
| InsightProfileChart | Hyperlink | Insight Chart of Key Variable Differential Contribution |
| FinalReportEntry | Memo | Final Report Description and Comments |

| Variable | Variable Type | Variable Description | Variable Definition | Status |
|---|---|---|---|---|
| CustomerID | N | Identification Number for Customer | CustomerID | XP |
| Current_purchase | N | Made a purchase in current campaign | Current_purchase | P |
| Recent_purchase | N | Recently purchased | Recent_purchase | P |
| Recently_contacted | N | Contacted within last 8 months | Recently_contacted | P |
| Very_recently_contacted | N | Contacted within last 30 days | Very_recently_contacted | P |

FIG. 18B

| Variable Editor ||
|---|---|
| Variable | Definition |
| Prior_purchase1_I | Prior_purchase1*Prior_contact_before_purchase1 |
| Description ||
| Purchase of first kind in recent campaign AND Contacted before purchase of first kind ||
| Edit  Save  Clear | Log  Square  SQRT  (X) |

Receiver Operating Characteristic
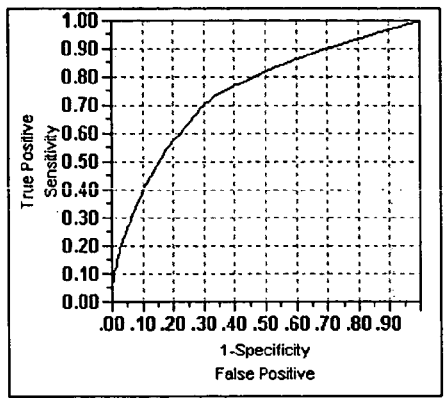
Using Current_Purchase='1' to be the positive level
Area Under Curve =
0.74906
Model Gains for Sample
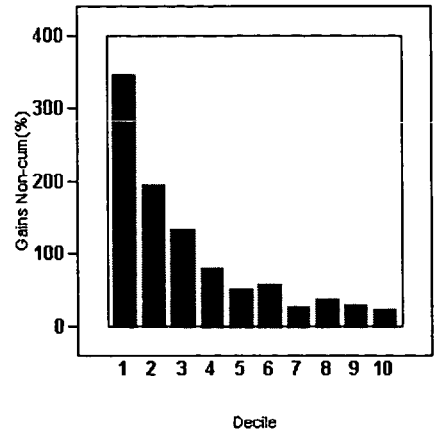
FIG. 23B
Persistence of Model for Key Predictor Variables
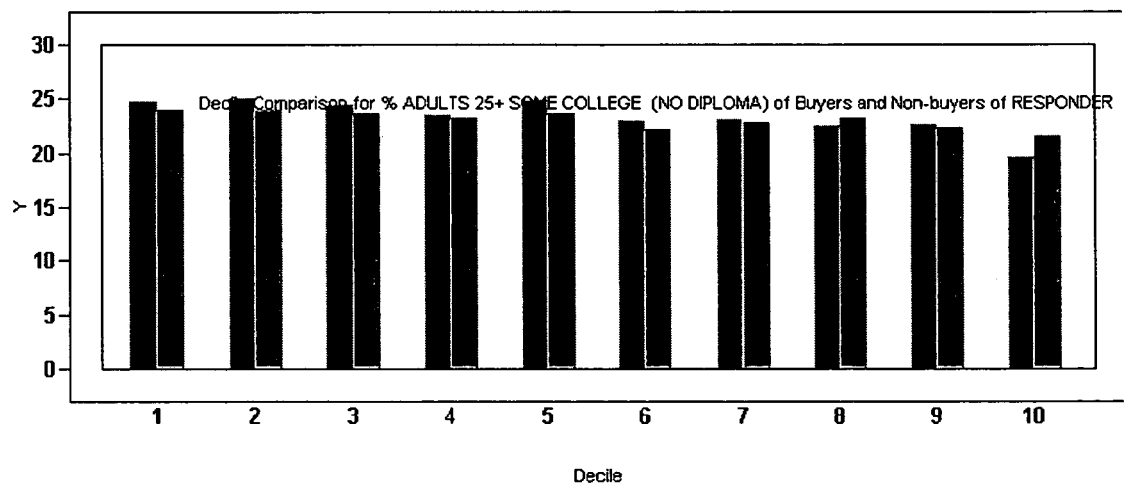
FIG. 23C Using Current_Purchase='1' to be the positive level
Area Under Curve =
0.74906

Using Current_Purchase='1' to be the positive level
Area Under Curve =
0.75884

Current_purchase Profile

Existing users of Current_purchase tend to be . . .

1. Purchase of first kind in recent campaign

2. Contacted before purchase of first kind

3. Contacted within last 8 months

4. Purchase of second kind in recent campaign

5. No purchase of first kind in recent campaign

6. Recently purchased

7. Contacted before purchase of second kind 8. located in Zone 6

DIMENSION REDUCTION IN PREDICTIVE MODEL DEVELOPMENT

BACKGROUND

This description relates to predictive modeling.

Predictive modeling, for example applied to targeted marketing, refers to modeling (a) which of a company's customers would likely buy a new or additional product (that is, would be susceptible to a cross-sell or up-sell effort); or (b) which prospects from a population of potential customers would be likely to accept an offer for a product or service (called acquisition by response or look-alike); or (c) which existing customers are most likely to cancel a current service (called retention or churn reduction); or (d) trigger points for behavior outside the normal range; or (e) to estimate the expected value or magnitude of a predicted outcome. Modeling is typically done by an analyst who is either an employee of a company or of an external consulting or service bureau. The analyst uses his experience and skill to create a custom model using available model building software applied to currently available data. The cost and accuracy of the model depend on the ability of the analyst, the time permitted to develop the model, the quality of the data used, and the performance of the model development software tools.

When the model is to be used to select prospects, who will be the targets of, say, a direct mail advertising campaign, the time and expense of creating the model and the quality of the selection produced by the model are important considerations.

SUMMARY

In general, in one aspect, a machine-based method includes receiving historical multi-dimensional data representing multiple variables to be used as an input to a predictive model of a commercial system, pruning variables for which the data is sparse or missing, and adjusting the population of variables to represent main effects exhibited by the data and significant interaction and non-linear effects exhibited by the data.

Implementations may include one or more of the following features. Adjusting the population of variables to represent main effects includes incremental adjustment of significant variables from the population of variables to the pool of main effects, incremental adjustment of significant cross-products within the pool of main effects, incremental adjustments of significant mixed sums of a variable within the expanded pool of main effects and a variable from outside the pool of main effects, incremental adjustments of significant mixed cross products of a variable within the expanded pool of main effects and a variable from outside the pool of main effects.

In general, in another aspect, the invention features a machine-based method that includes receiving historical multi-dimensional data representing multiple variables to be used as an input to a predictive model of a commercial system, a directed sequence for adjusting the population of variables to represent main effects exhibited by the data and significant interaction and non-linear effects exhibited by the data.

Implementations may include one or more of the following features. Adjusting the population of variables to represent main effects includes incremental adjustment of significant variables from the population of variables to the pool of main effects, followed by incremental adjustment of significant cross-products within the pool of main effects, followed by incremental adjustments of significant mixed sums of a variable within the expanded pool of main effects and a variable from outside the pool of main effects, followed by incremental adjustments of significant mixed cross products of a variable within the expanded pool of main effects and a variable from outside the pool of main effects.

Other aspects include media that bear instructions to perform the methods, apparatus to perform the methods, and other methods associated with those described above.

ADVANTAGES

Among the advantages of these features and aspects are one or more of the following. Project management of the workflow of model development, including scored list generation, report production, and model maintenance is achieved. Complete documentation and project replication or project refinements are easily performed at a later date, even by analysts without prior involvement. Control is maintained in a high volume production environment without requiring analyst initiative. The efficiency of orchestrating the workflow is improved so as to minimize development time. The system documents both successful and unsuccessful approaches as the analyst applies serial testing of alternative data treatments and alternative techniques, enabling easy replication. The unifying graphical user interface assures that the analyst uses the model generation platform's integrated techniques correctly. The interface controls the staging of the successive techniques and reduces inefficiencies. The analyst is discouraged from making inappropriate decisions at choice points by enabling only choices that fit the data types. The datasets of interest for such models involve numerous records with a large number of attributes, many of which are redundant or irrelevant, so their elimination results in improved analysis, reduced complexity and improved accuracy. For typical datasets with a large number of attributes, the systems transforms variables, whose raw form lack predictive power, or are misleadingly complex, into designer variables producing efficient models with strong predictive power. The system provides effective management, interpretation, and transformation of large numbers of complex attributes. The system readily constructs powerful models from disparate datasets with parallel or sequential stages that facilitate the achievement of targeting marketing goals with multiple products or offers, and cross product. The system assures consistently successful models that are optimally developed and thoroughly tested even when executed by analysts without years of experience. Reliable and informative measures of model robustness are provided. A detailed perspective on the distinguishing characteristics of customer segments can be used to design creative marketing media.

Other aspects, features, and advantages will be apparent from the description and from the claims.

BRIEF DESCRIPTION OF THE DRAWINGS

FIG. 3 is an exemplary design layout of a model project database

FIGS. 18a and 18B are an exemplary representation of a model project entry form.

FIGS. 21A, 21B, 21C, 21D, and 21E show exemplary graphical user representations of a variable response function, a variable distribution, a partition tree of a variable, and the application of the variable editor to transform variables with an cross-product interaction and showing an addition of the constructed interaction variable to a list of predictor variables.

FIGS. 23A, 23B, and 23C show an exemplary graphical user representation of a model selection interactive dialog showing a selection option for model variable persistence; an exemplary graphical user representation of a gains chart and some statistical results; and an exemplary graphical user representation of a persistence chart by deciles for a typical continuous variable showing an approximate equivalence of averaged values for target and non-targets.

DETAILED DESCRIPTION OF THE INVENTION

Figure 1:
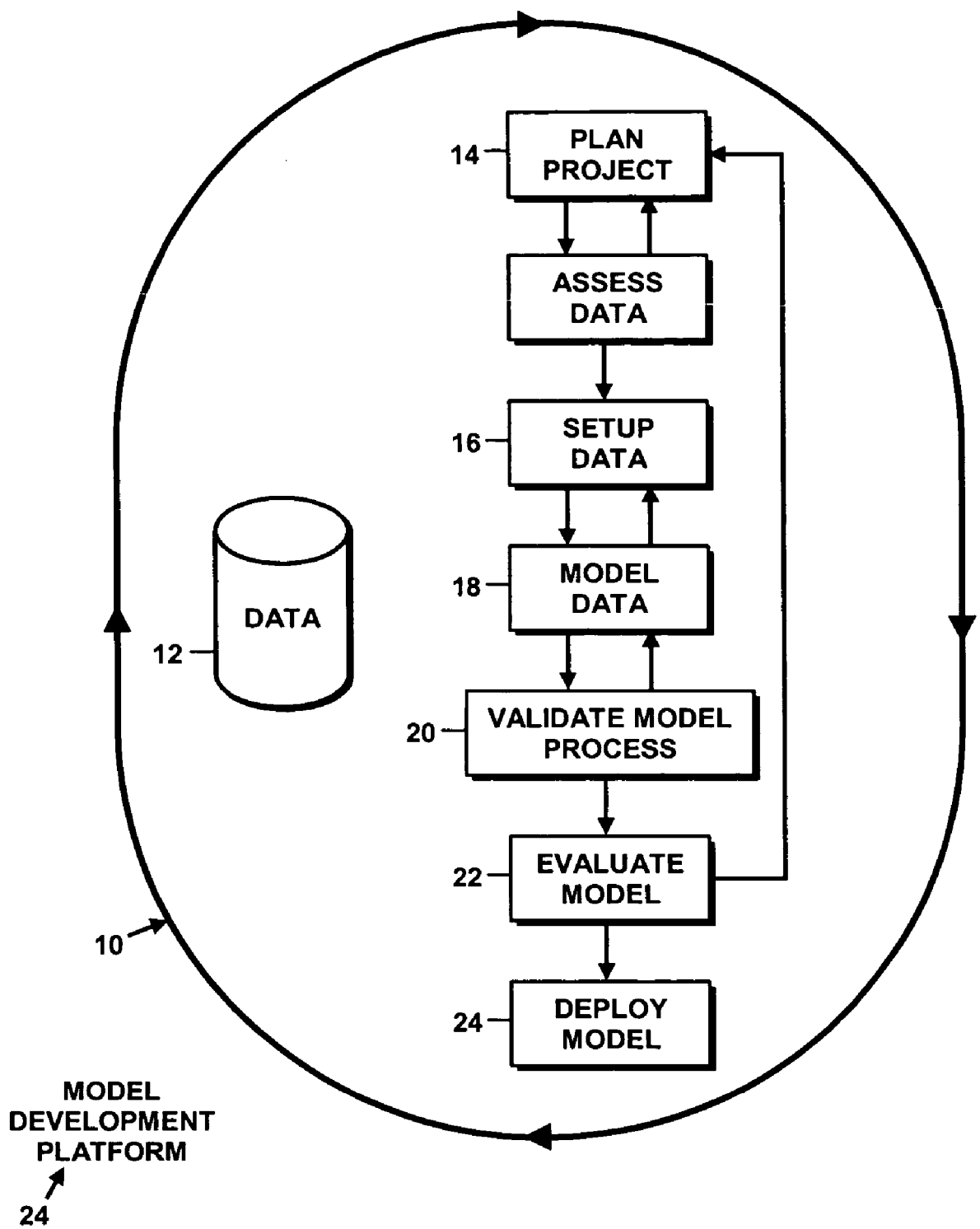
FIG. 1 is a schematic diagram of a model development platform.

FIG. 1 illustrates a sequence 10 of development and deployment activities that enable a user to generate a predictive model. The development of the model is organized on a project basis. A successful model typically produces a series of updates and modifications as the market or commercial system to which the model is directed evolves and changes. Organizing the activities on a project basis reduces wasted time and improves the quality of the models. By enforcing a carefully managed project paradigm, models can be generated, updated, changed, reviewed, and deployed in a high-volume production process, at lower cost, and with better results.

The model development and deployment activities may begin with a database 12 that covers historical events associated with the system being modeled. For example, if the system being modeled is the behavior of customers of a vendor, the database 12 may include records that identify each customer, demographic information about each customer, information about products that the customer owns, and communications that the customer and the vendor may have had. Project planning 14 may be the initial step in model development and can be a step that is revisited from later activities. After the initial project planning, data in the database 12 may be set up 16, and modeled 18. Then the model development process (which may be expressed in software) is validated 20. Then the model (which may be expressed in software) that is generated using the validated model development process may be evaluated 22. After evaluation, further project planning may be necessary and deployment of the model may be scheduled 24. Deployment could include, for example, applying the model to live data to generate predictive information (for example, a list of people who the model predicts will be more likely to accept a new product offering or to predict the most profitable combination of channel and target selection) or delivering the model to a client for use with current and future data that is similar to the originally analyzed data referenced in the database. All of the activities of FIG. 1, and others, are managed and enabled by a model development platform.

Figure 2:
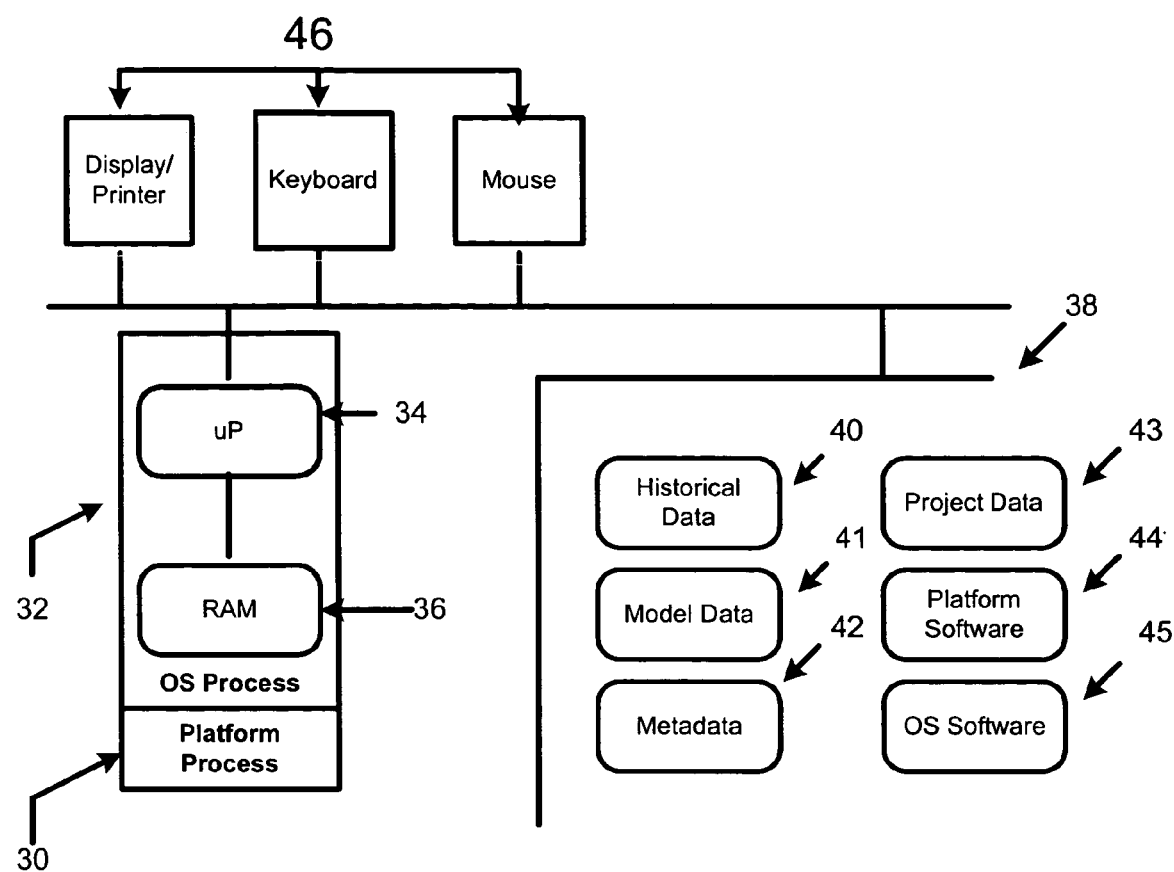
FIG. 2 is a schematic diagram of a computer system.

As shown in FIG. 2, the model development platform may be implemented in software 30 running on a workstation 32 that includes a microprocessor 34, a random access memory 36 that stores instructions and data that are used by the microprocessor to run the program, a mass storage system 38 that holds the historical data of the system being modeled 40, metadata 42 related to the historical data, generated by the model generation platform and used in generating the model, project data 43, model data 41, an operating system 45, and the model development platform software 44 related to the management of the development activities as projects, among other things. Input/output devices 46 enable a user to interact with the model generation platform to generate a model by a series of steps to be described later.

Although a single workstation is shown in FIG. 2, the system could be implemented on multiple workstations on a network, such as a local area network or a wide area network or implemented in client-server mode using a server on a network. Access to the features of the model generation platform software could be permitted using an application service provider (ASP) model of distribution such as a web service over the internet. Or the model generation platform software could be distributed by downloading or on portable storage media.

The use of the model generation platform software is based on a project paradigm. Whenever a user wishes to develop, modify, update, copy, or enhance a model, he must do so within the context of a project. To keep track of and control the use of projects, the model development platform maintains the project data in the form of a table the definition 50 of which is shown in FIG. 3. The values in the table maintain the integrity of the model development process. Among the fields for each project record are an ID 52, a name 54, a project goal 56, a pathname 58 to the historical data (called "Project-Dataset" in FIG. 3), a pathname 60 to metadata and model data (called "ProjectDataDictionary"), and a target variable 62 for the model selected to be the dependent or predicted or outcome variable of the model. Other entries in the table will be understood with reference to the discussion below. Thus, the model development platform automatically stores structured project information that captures a state of the project at successive steps in generating the model.

Report Generation

Another feature of the model development platform is to generate reports for tracking by model analysts and for executive decisions. The reports may be in the form of web browser displayable hypertext markup language (HTML) documents (text and graphics) and extended markup language (XML) representations that can be stored digitally and re-filled and re-purposed. Such reports facilitate going back to prior projects and prior models. The reports also show the choices made when building models.

Figure 4:
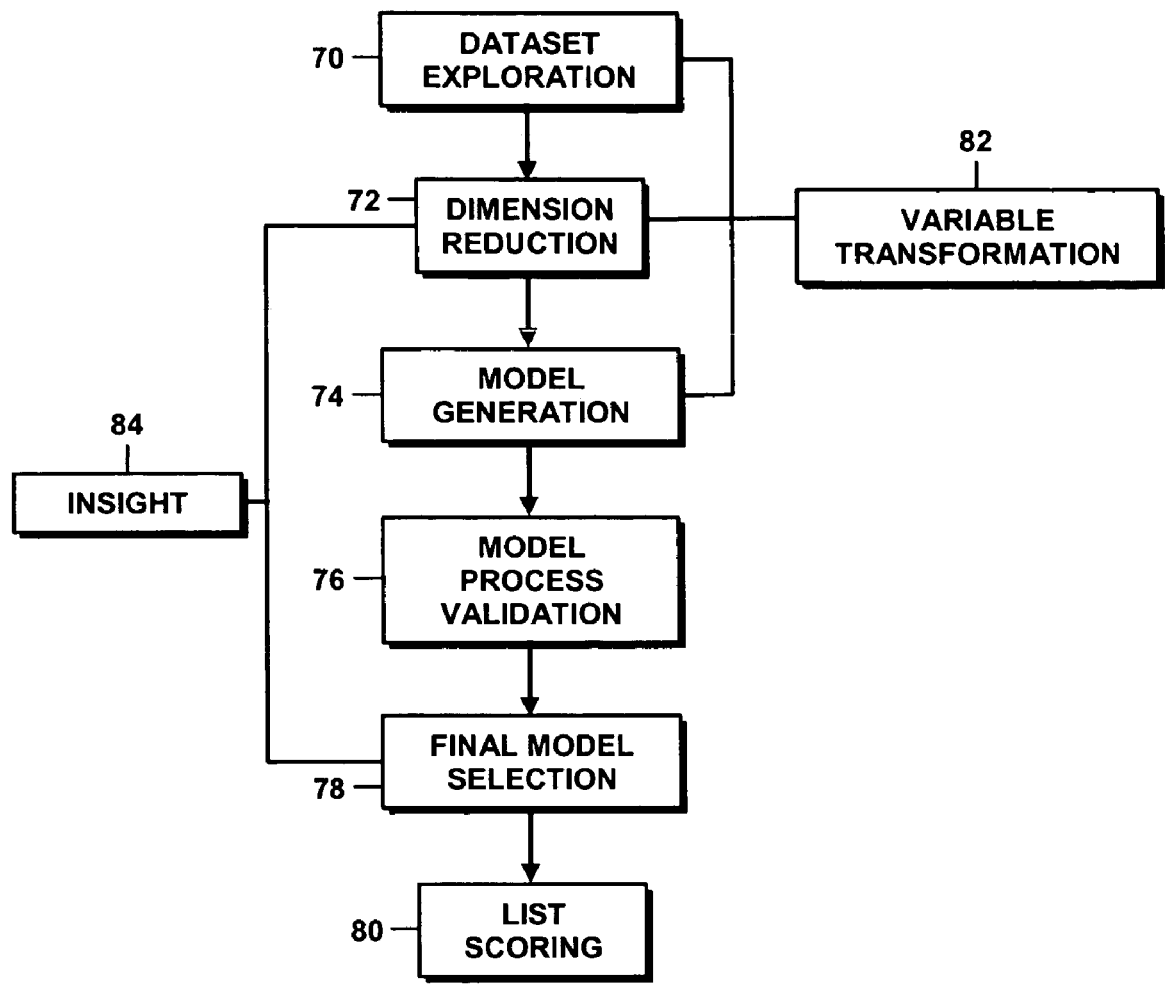
FIG. 4 is a schematic diagram of steps in a model development

The sequence of activities involved in generating a model is shown in FIG. 4. The model development platform enforces the performance of these activities in the order shown: dataset exploration 70, dimension reduction 72, candidate model generation 74, model process validation 76, final model selection 78, list scoring 80, and customer insight generation 84. Variable transformation 82 is an aspect of dataset exploration, dimension reduction, and model generation. At each step, statistical tables, graphs, and charts are generated in XML or directly into web-browser viewable form. Hotlinks to the HTML documents are maintained in the project table.

Types of Reports

In the dataset exploration stage, aspects of the historical data may be examined in terms of the predictor variables. By predictor variable, we mean a potential covariate or independent variable of a model. In a manner explained later, the analyst may select analysis tests using a checkbox or point and click interface. The software then automatically computes, for the variable: (a) variable response graphs in the variable editor showing which values or trends are most closely associated with the dependent variable in order to select, redefine, or interact variables to predict more efficiently and more accurately the target outcome, (b) development sample distributions illustrating for each predictor variable the target response frequency for each target value, for example, the value "1" for a buyer and the value "0" for a non-buyer with descriptive statistics of central tendency and dispersion, (c) interaction trees showing successive binary recursive partitioning of a single variable or of the set of predictor variables in descending rank order of the most significant log likelihood ($G^2$) variables that best classify the prospects (within the data) from the non-prospects. Such analysis informs the appropriate variable transformation to maximize predictive power to supplement the automatic transformation of variables to that purpose preceding or following dimension reduction.

In the stages of model generation, model process validation and final model selection, the user by means of point and click or checkbox can invoke software that automatically computes (d) candidate model statistical features tables which display ranked significant variables and goodness-of-fit as measured by the c-statistic (i.e., the area under the receiver-operator-characteristic (ROC) curve), (e) non-cumulative gains charts showing the response rate as percentile per decile compared with random selection as a base rate (100%), (f) cross-sample comparison statistics for the candidate model that compare the development sample and validation datasets to determine the robustness and generality of the candidate model, (g) cumulative and non-cumulative gains charts that are similarly computed for the development sample and validation datasets to reveal whether the candidate model is sufficient in terms of performance and robustness beyond the sample dataset on which it was based, (h) comparison statistics and charts for the key variables and model scores in the development dataset and scoring dataset computed to assess the validity of applying the model to score the campaign list.

In the stage of target profile generation, the user by means of point and click or checkbox can invoke software that automatically computes (i) profiles and charts of key variables ranked in order of significance are computed to provide insight into the target population of buyers. At the end of a cycle of model development, the user by means of point and click or checkbox can invoke software that automatically computes 0) a summary report including all the above as hotlinks to the corresponding HTML documents along with the initially collected information at the model processing entry point.

Graphical User Interface

To make model development efficient, model projects are developed along a managed sequence of steps interactively with the analyst using a reentrant graphical user interface. The user can invoke the modeling process repeatedly, for example, to review outcome response functions for individual predictor variables, or recursive partition trees for individual variables or for the set of predictor variables; to modify the predictor variable pool, to create and filter additional variables, or to modify the candidate model. The integrity of the model is maintained by the project database and the guidance supplied to the user.

To begin a project, the project requirements, constraints, and goals are entered as a first step. An historical dataset is selected with its accompanying metadata. The metadata may include but is not limited to variable names, variable descriptions, variable definitions which may involve transformation of other variables, variable measurement type such as ordinal, categorical, or interval, and variable model status such as predictor variable or excluded variable. This entry step is followed by sample/validation set allocation, sample data exploration 70, model dimension reduction 72, model generation 74, model process validation 76, final model generation 78, which may include model ensembles, and model parameter reporting or list scoring 80 (see FIG. 4).

The user's choices are guided by the model generation platform. For example, if too few targets are included in the sample dataset for reliable results, a warning is issued so corrective action can be taken. Included in the initial dataset exploration is variable interaction detection. Such interaction effects reflect the complex interrelations of the types of data available and may have powerful influences on the choice of the optimal model. The model process is re-entrant so that the user can make revisions without restarting. However, the user interface provides a goal-oriented framework for achieving successful models. Even though the user may re-enter any activity of model generation at any time, once having reentered, his work is guided by the software to follow the predefined sequence of project steps from the point of reentry.

Thus, there is an effective scheme of user interaction that permits both user decisions to reenter the process at an earlier point and software-guided sequences of steps to be followed when reentry occurs. The sequencing of these steps has an important impact on model performance. For example, modeling before dimension reduction may produce inefficiency (the computationally intensive modeling process may take time to complete), loss of robustness (variables may be included that spuriously inflate the performance of the model and degrade the validation), and loss of predictive power (raw untransformed variables will mislead the modeling process by diluting predictive power).

Figure 5:
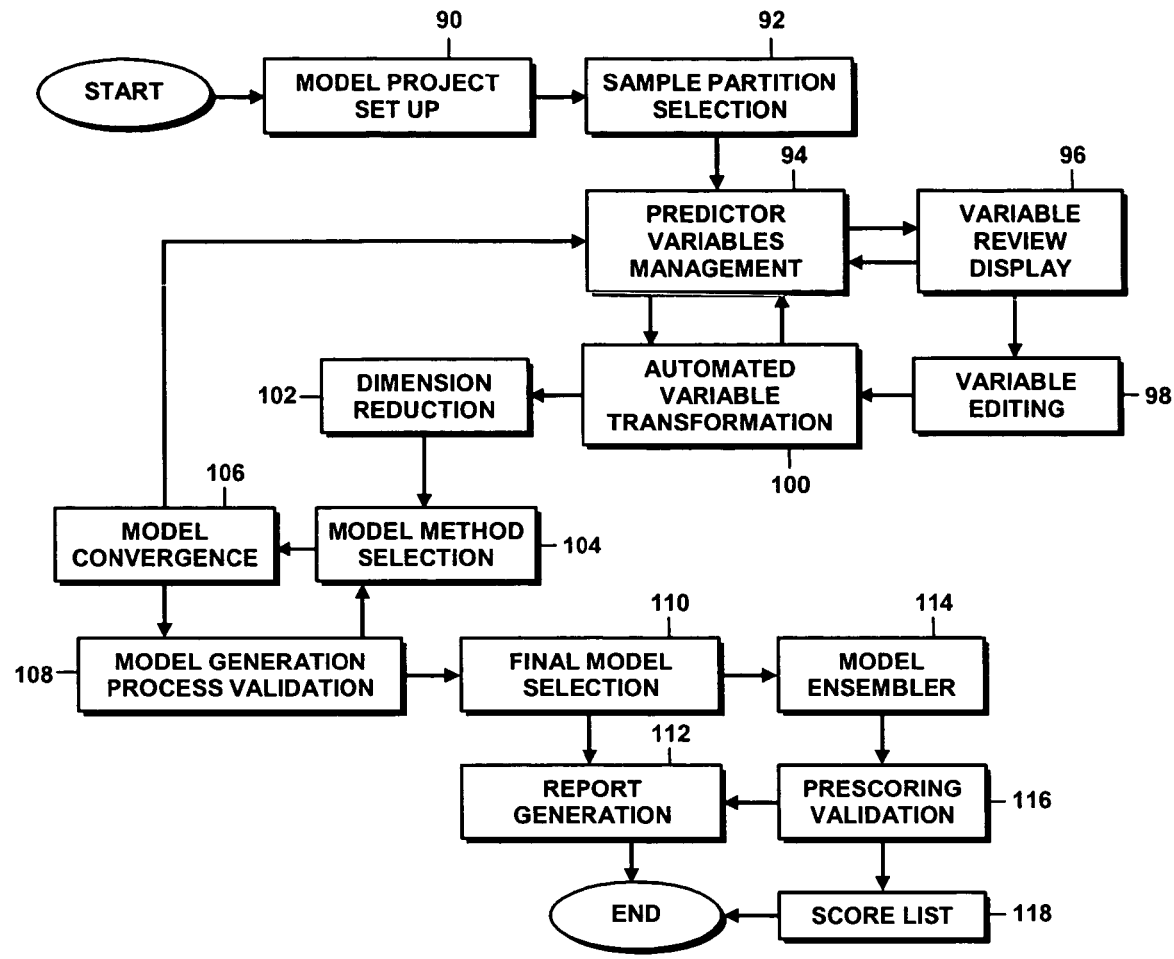
FIG. 5 is a schematic workflow diagram of a model development process

As shown in FIG. 5, the model generation platform controls the modeling process as a workflow through a sequence of stages, primed by informational tables, graphs and charts, with the goals of obtaining insight into the target population and then generating an actionable scoring list of prospects that belong to the population. The business logic of the modeling process workflow is embedded into the state chart of FIG. 5. Details of the workflow will be discussed later. The blocks represent activities in the model generation process. A new model project is initially set up 90 with at least one outcome variable selected, then a subset of the full historical data as a sample partition 92. Subsequently the record attributes are reviewed 94, displayed 96 and edited 98 and/or automatically transformed into predictive variables 100. The set of variables is reduced to those that are maximally predictive by dimension reduction 102. Then a model method is selected 104 and fitted to convergence 106 with the sample dataset. The model generation process is validated 108. With the validated model generated process a final model is selected 110 and persisted along with other model generation reports 112. The persisted models are used singly or in combination 114 to maximize expected return on investment then applied to score lists 118 after first validating the applicability of the model ensemble to the list 116. The arrows represent the main sequence that the software permits the analyst to follow.

Complex Data Preparation Transforms

Figure 6:
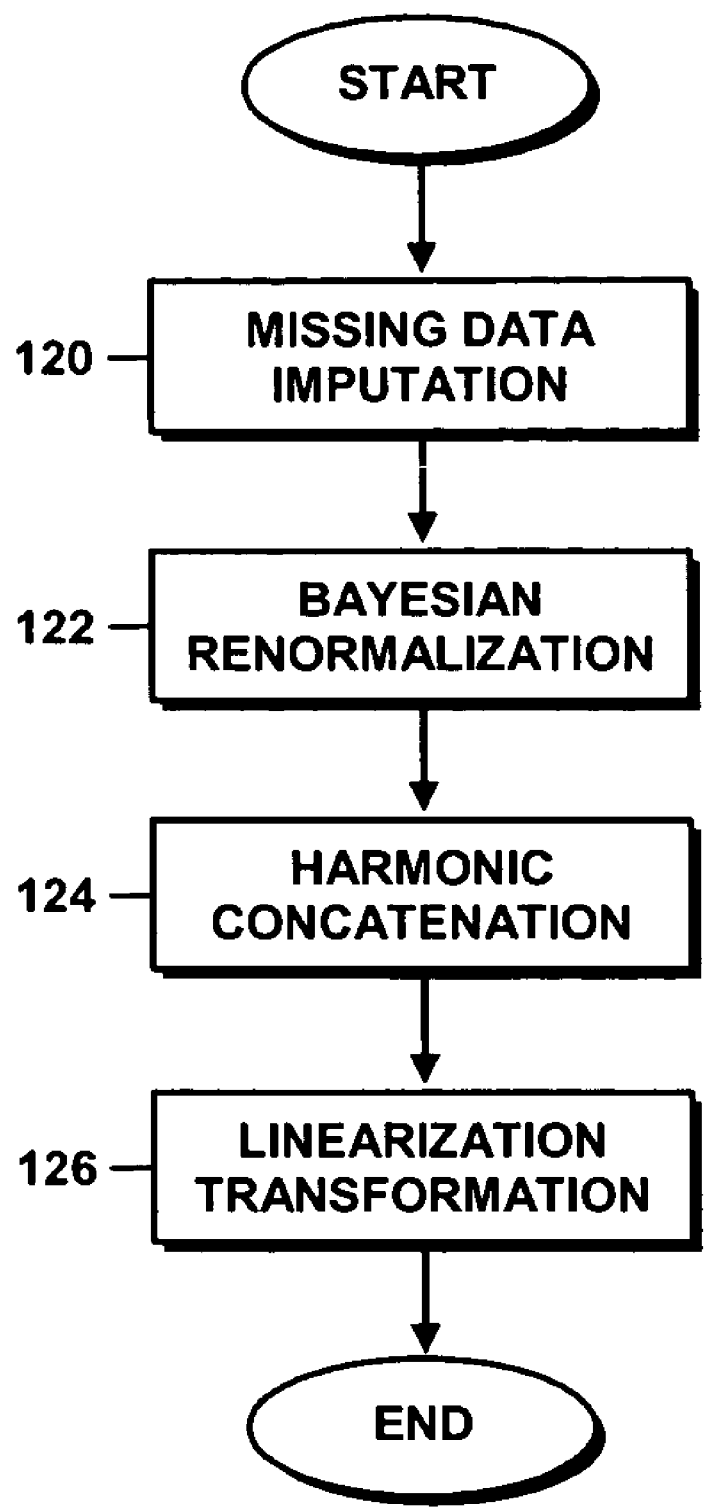
FIG. 6 is a schematic workflow diagram of a variable transformation process

Even when aggregated and summarized, the resulting variables may not reveal their full predictive power. As shown in FIG. 6, the model generation platform provides automated and interactive features to transform variables by imputing missing values 120, compensating for sparsely sampled values 122, smoothing variables with grouping and splines 124, and straightening variables with mathematical transforms 126, such as squares, logs, and hyperbolic tangents. Information about the type of measurement a variable represents is retained in the metadata. The model generation platform metadata includes information about the nominal, ordinal, or interval scalability of variables, enabling differential and hence more accurate treatment of data. The model generation platform tracks predictor variables and their untransformed antecedents, and provides an editing facility for applying transforms and visualizing the distributions of the variables relative to the target populations.

The model generation platform persistently stores the metadata for the variables imported in the development dataset using XML transforms The variables from the originating development dataset are typed for strength of measurement (e.g., nominal, ordinal, interval/continuous) with descriptive labels for ease of interpretation. For active variables a status is assigned (P, XP, T, XT) to reflect whether the variable is in the pool of predictor primary variables (P) or transformed variables (T), or has been excluded from either (XP or XT) with the applied transformation in the variable definition field. There are several options for transformations to apply for nonlinear continuous variables and non-uniform categorical variables:

Logarithmic transform: If((:X>0), Log(:X),0)
Square::X^2
Square root: If(:X>0, Root(:X, 2), 0)
Box-Cox power (r) transform: If(:X>0, Exp(:r*Log(:X)), 0)
Nonlinear interaction::X*:Y
Partition: If(LowerBound<=:X|:X<UpperBound, 1, 0)
Missing value: If(Is Missing(:X), 0, If(:X==1, 1, 0))

Certain transformations may be inappropriate or may be without effect for predictor variables of a particular measurement type. For example, squaring a binary categorical variable {0,1} would have no effect and taking the log would be inappropriate. The model generation platform automatically disables the inappropriate options when the analyst is editing variables. In the editing process during the model development process, variables can be examined, redefined, and shifted in or out of a pool of predictor variables using a model project variable editor.

Missing Data Imputation

In the recursive interaction analysis, missing values are imputed by a random method using the distribution of the variable in question. Where the percentage of missing values of a particular attribute is small, typically 10% across the sample dataset, then single imputation by mean, by hot-deck substitution, or by regression can be employed, although the distribution statistics are biased. For continuous variables with missing values, a method of regression imputation can be used to estimate predictor variable missing values from the regression on the known predictor variables. However, the method of multiple imputation can be applied by combining results from single imputations without resulting bias to the distribution statistics for sparse data provided the missing data are either missing at random or missing completely at random.

Figure 7:
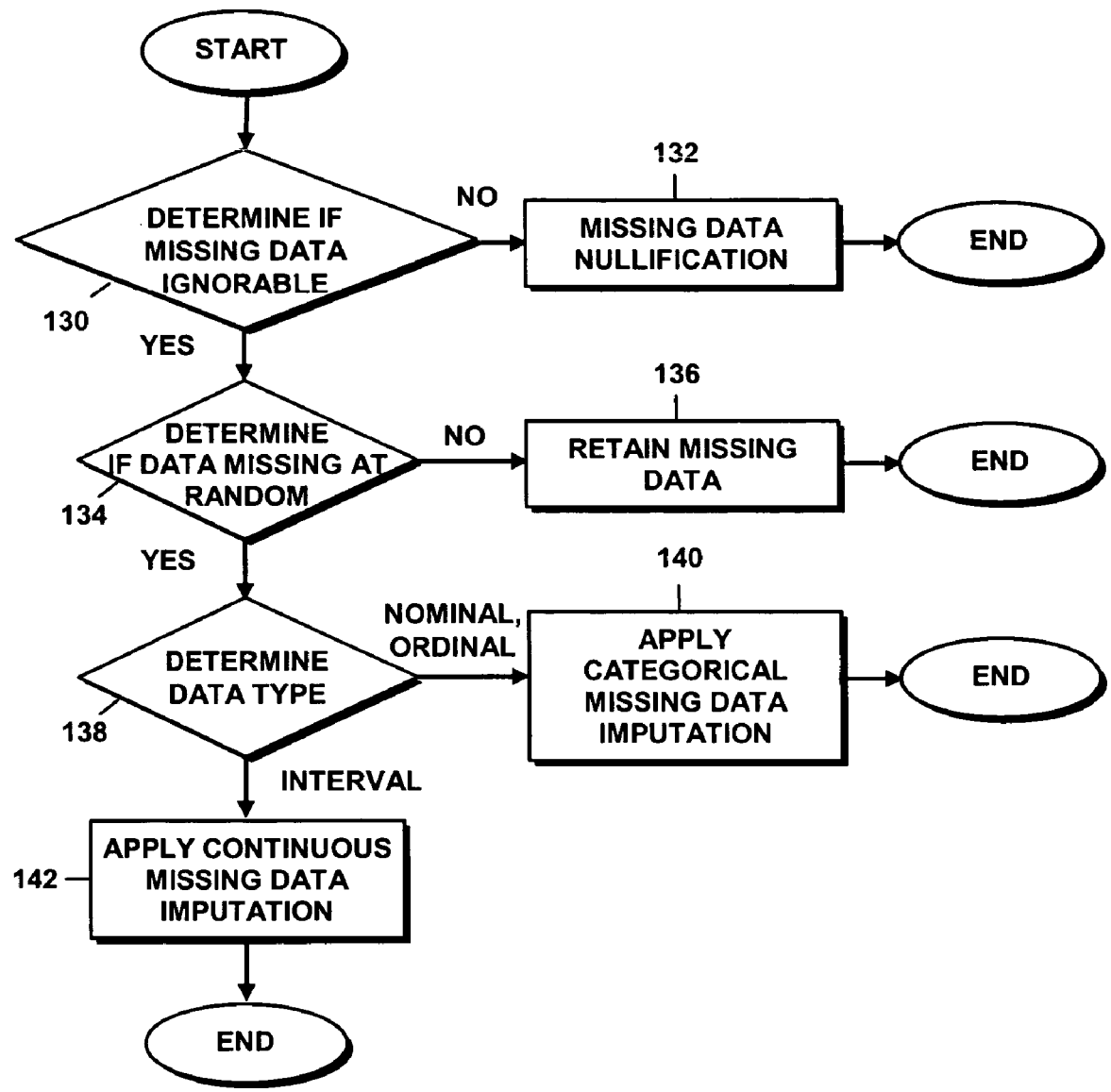
FIG. 7 is a schematic workflow diagram of a missing data imputation process

With reference to FIG. 7, the first step 130 is to determine if the values that are missing, for example, from a categorical variable are non-ignorable, i.e., whether an absence of response is equivalent to an answer of 'No'. If so, then the missing value can be replaced 132 without loss of information by 'No' or its numerical equivalent. Next, a determination 134 needs to be made whether the values missing from the record are missing at random in a statistical sense. If not, then imputing a missing value may introduce bias so the missing value is not modified 136. Records without missing data may be segregated to avoid loss since for most modeling methods records with missing data for a single predictor variable are ignored. If, on the other hand, the data is missing at random then specific techniques can be applied depending on the type of variable as determined from the metadata of the data dictionary 138. For nominal or ordinal variables a categorical missing data imputation 140 can be made. For continuous variables an interval missing data imputation 142 can be made.

Bayesian Renormalization

Conventional modeling approaches can be significantly misled by spurious associations between the available variables and the target variable. To determine the deep structure in the typical sample datasets used in predictive modeling, it is important to avoid attractive artifacts that suggest strong predictive power. The model generation platform achieves this by a form of Bayesian renormalization, which is applied automatically to significant categorical variables, prior to binning, but also can be selected for manual application to identified categorical variables in the variables palette.

The model generation platform's predictor variables palette displays the variables present in the development dataset according to variable status, i.e., whether the variable is considered currently as a predictor variable, or has been excluded from present consideration as a predictor variable. When a displayed variable has been selected, the associated metadata, e.g., description and definition, is shown along with a hyperlink to a graph of the variable.

Figure 8:
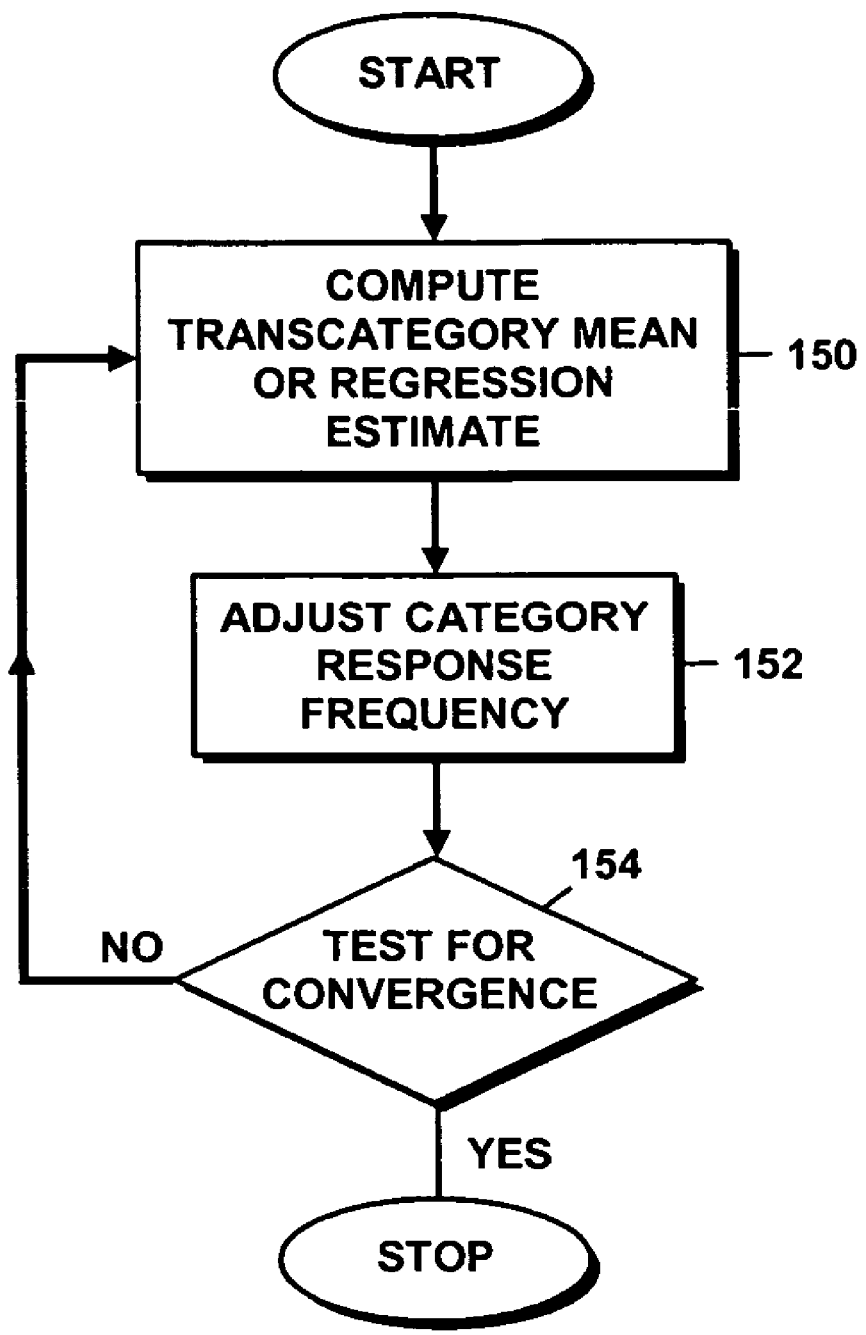
FIG. 8 is a schematic workflow diagram of a Bayesian renormalization process

In the algorithm described by FIG. 8 for the case of a multi-valued nominal variable, the model generation platform calculates the response frequency of the dependent (predicted) variable and ranks those variable values by response frequency. The calculation of response frequency based on the development dataset is adjusted iteratively by Bayesian analysis based on the variable's a priori response frequency to estimate the underlying probability. Initially, the mean response frequency is computed, or, for variables with a functional dependence on subvariables, a regression surface is calculated 150. An advanced version of this approach is to regress to a hyperplane fitted to X using other covariates. To reduce the variability of an unstable estimator of response frequency for a particular dataset, $X_m$, denote the vector of response frequency prediction (at the observed sites or at new locations) by $F(X_m)$.

The response frequency for a given value is regressed toward the mean response frequency based on the number of observations or toward a regression hyperplane determined by subvariables underlying the variable of interest 152. Denote the reweighted estimate of $F(X_m)$ where the weights, $\omega(m)$, give rise to a weighted sample as $\{X_m, \omega(m)\}$. A convergence test is then performed on the recomputed transcategory mean or regression plane 154. If the iteration has not converged within a reasonable approximation the process is repeated; otherwise, the adjusted response frequencies are used in subsequent operations. The high response frequency of a sparsely populated value bin will be reduced and the low response frequency of a sparsely populated value bin will be increased. However, the response frequency of a heavily populated value bin will remain essentially the same.

Harmonic Concatentation Transformation

Categorical values associated with similar target variable response frequencies (subject to sampling considerations) are conjoined into a smaller set of categories, which then form a statistically optimal classification mapping. The implementation may include prior imputation of missing data for the variable, or prior Bayesian renormalization, then sequential binary partitions with respect to the target or independent variable using the likelihood-ratio statistic, $G^2$, which for a candidate input attribute, $A_i$, and the target attribute, T, is given by:

$$G^2(A_i;T/z) = 2 \cdot (\ln 2) \cdot E^*(z) \cdot MI(A_i;T/z) \qquad [7]$$

where $E^*(z)$ is the number of records associate with node z and MI is the measure of mutual information. So that $G^2$ is actually twice the natural log entropy or change in the entropy, sigma-log(p), for each observation, where p is the probability attributed to the response that occurred.

Figure 9:
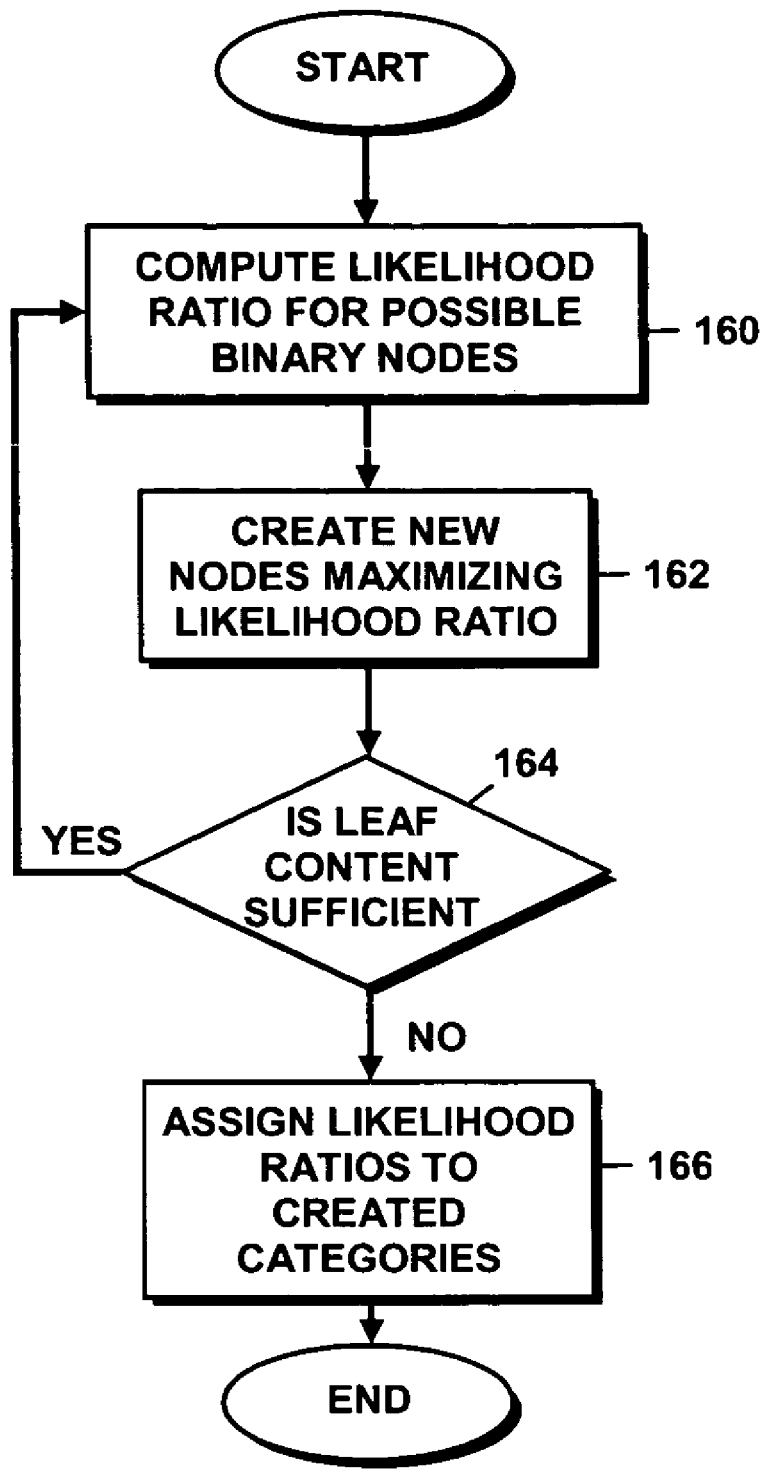
FIG. 9 is a schematic workflow diagram of a harmonic concatenation process

The procedure for obtaining the optimum number of groupings is described in FIG. 9. The likelihood-ratios ($G^2$ values) are computed for the binary splits for the predictor attribute at the given node for the target outcome attribute 160. Then the binary split that maximized the value of $G^2$ is chosen 162. If one or more of the resulting nodes cover sufficient proportion of the number of records in the sample as determined by k-fold cross validation then the process iterates 164 until completion. Sufficient proportion should be in excess of 5% of the sample size and for variables for which this procedure generates improved models, maximization to yield not more than ten (10) intervals in the range of the variable containing not less than ten (10) percent of the total response. Then the records for the predictor attribute each node are assigned the value of the likelihood ratio, $G^2$ 166.

Complex Dimension Reduction

A model can be viewed as a hyperplane in multidimensional space defined by the set of variables that best separates (within the space) the targets (for example, the customers of a company who would be most likely to respond favorably to an offer for a new product) from the non-targets (those customers who would not respond favorably). Model development includes a process of removing nonsignificant variables (dimensions) of the space until the hyperplane is defined by a coherent set of significant variables (predictor variables) and their interactions (in the real world data, the initial variables may not be orthogonal). Simple dimension reduction (variable elimination) can involve removal of variables having limited predictive power. But variables that alone have only limited predictive power may, through interaction, have a significant predictive ability. Complex dimension reduction involves filtering to retain such variables and constructing complex, pluripotent variables to move the modeling process over the fitness landscape to a global optimum.

To do this the model generation platform uses a cascade of filters ($F_n$) to screen out non-significant predictor variables:

$$F_0(G(x^1_1, \ldots, x^1_n)) \rightarrow H(x^2_1, \ldots, x^2_m) \qquad [1]$$

where $G(x^1_1, \ldots, x^1_n)=1$ and $H(x^2_1, \ldots, X^2_m)=1$ are the hyperplanes defining the respective successive models.

Figure 10:
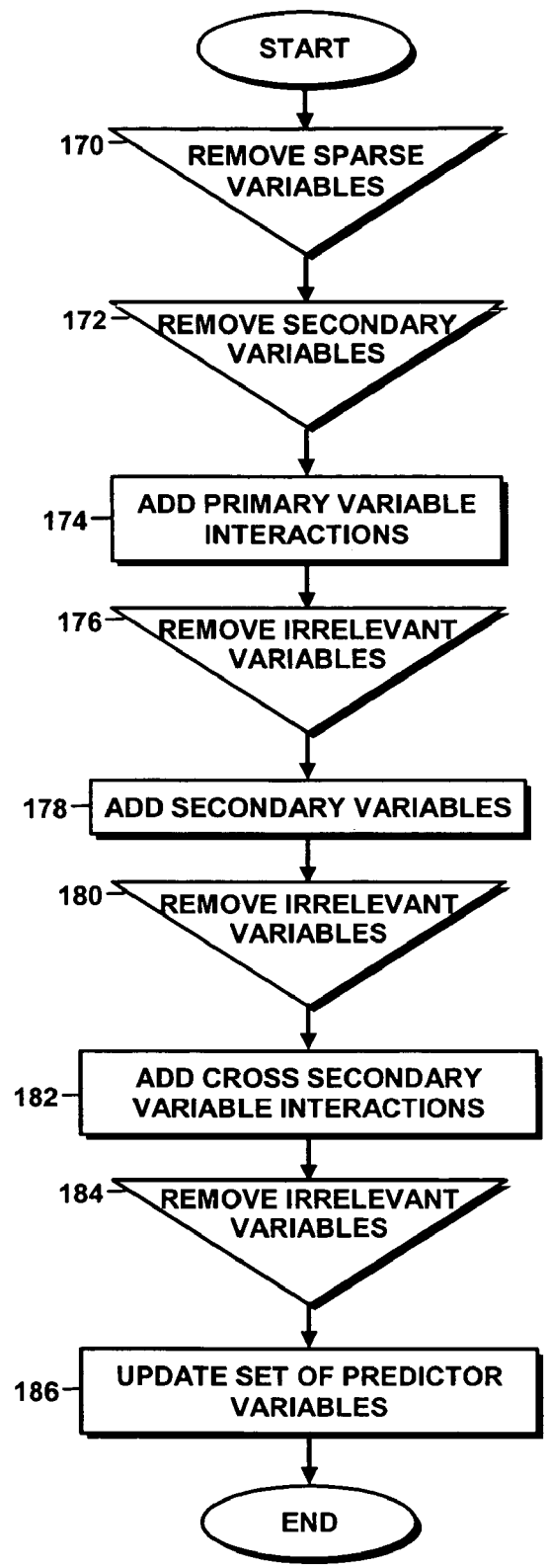
FIG. 10 is a schematic workflow diagram of a dimension reduction process

The flowchart in FIG. 10 provides an example of such cascade of filtering operations on the set of predictor variables. The first filter 170 reduces the dimensionality of the modeling space by eliminating variables, $x^1_k$, or which the density, $D(x^1_n)$, is less than some fixed constant, $C_1$. (These are variables which have not or can not be processed for missing data imputation.)

$$F_1(H(x^2_1, \ldots, x^2_m)) \rightarrow J(x^3_1, \ldots, x^3_p) \qquad [2]$$

where p is less than or equal to m, $H(x^2_1, \ldots, x^2_m)=1$ and $J(x^3_1, \ldots, x^3_p)=1$ are the hyperplanes defining the respective successive models. The dimensionality of the dataset has been reduced from m to p.

In the second filtering stage 172, a subspace is iteratively generated by including only significant variables, e.g., $x^2_k$, whose probability of non-contribution, $[1-\Pr(y|x^2_k)]$, is less than a fixed constant, $C_2$.

$$F_2(H(x^2_1, \ldots, x^2_p)) \rightarrow J(x^3_1, \ldots, x^3_q) \qquad [3]$$

where $H(x^2_1, \ldots, x^2_p)=1$ and $J(x^3_1, \ldots, x^3_q)=1$ are the hyperplanes defining the respective successive models. In effect, the second filter reduces the dimensionality of the modeling space from p to q.

In the third stage 174, the subspace, $X_Q$, is expanded by including all significant cross-products, $x^j_k * x^p_q$, where $x^j_k$ and $x^p_q$ are in $X_Q$, then applying a filter 176 to retain only significant variables, e.g., $x^1_k$, whose probability of non-contribution, $[1-\Pr(y|x^4_k)]$, is less than a fixed constant, $C_3$.

$$F_3(J(x^4_1, \ldots, x^4_q)) \rightarrow K(x^5_1, \ldots, x^5_r) \qquad [4]$$

where $J(x^4_1, \ldots, x^4_q)=1$ and $K(x^5_1, \ldots, x^5_r)=1$ are the hyperplanes defining the respective successive models. In effect, the third filter 176 reduces the dimensionality of the modeling space from q to r.

In the fourth stage 178, the augmented subspace, $X^\#_Q$ is further iteratively expanded with all the subspaces, $x^j_k * x^p_q + z^r_s$, which are now significant where $z^r_s$ are from $X_M$-$X_P$ then applying a filter 180 to retain only significant variables.

In the fifth stage 182, the augmented subspace, $X^{\#\#\#}_S$, is further augmented with all the cross-products, $x^j_k * z^r_s$, where $x^j_k$ are from, $X^{\#\#\#}_S$, and $z^r_s$ of from $X_N$-$X_M$ then applying a filter 184 to retain only significant variables, e.g., $x^5_k$, whose probability of non-contribution, $[1-Pr(y|x^5_k)]$, is less than a fixed constant, $C_4$.

$$F_5(K(x^5_1, \ldots, x^5_r)) \to L(x^6_1, \ldots, x^6_s) \quad [5]$$

where $K(x^5_1, \ldots, x^5_r)=1$ and $L(x^6_1, \ldots, x^6_s)=1$ are the hyperplanes defining the respective successive models. In effect, the fifth filter 184 reduces the dimensionality of the modeling space from r to s.

The filters adjust the dimensionality of the modeling space by mapping into transformed variables with truncated ranges or mapping into compound (nonlinear) variables $(x^4_q = x^3_i * x^3_1)$ whose probability of non-contribution, $[1-Pr(y|x^1_k)]$, is less than a fixed constant, $C_j$. The resulting hyperplane represents an efficient classification mapping. The set of predictor variables is then adjusted to include the variables passing through the sequence of filters resulting in an updated collection of predictor variables 186 available for constructing predictive models.

Modeling Choice

Figure 11:
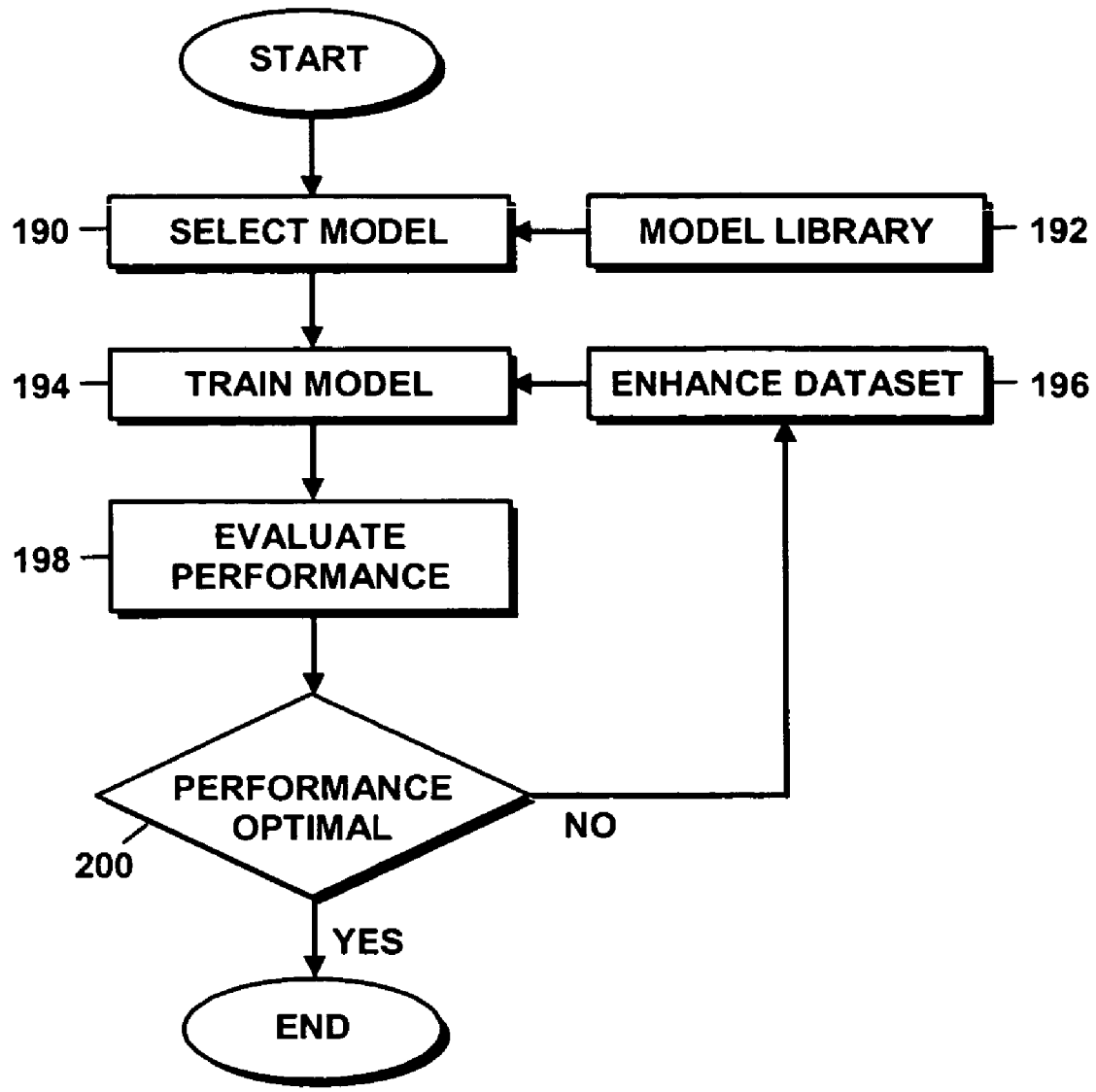
FIG. 11 is a schematic workflow diagram of a model generation process

In the context of a model development project, the mathematical or statistical approach should be matched to the type of variable and to distribution variability. The model generation platform for the modeling stage described in FIG. 11 has access to a variety of models through a library 192 of model functional types, for example, but not limited to logistic, general location, and decision trees.

The model generation platform generates predictive analytic model that, for example, retrospectively classify prospects and non-prospects, starting with the selection of the appropriate model type 190. For example, when the dependent variable has nominal measurement type and the required assumptions about the dataset distributions are minimal, logistic models are desirable provided extreme outliers can be avoided. The model generation platform filters out such extreme outliers. Following dimension reduction the number of significant variables typically has been reduced into the range where a stepwise nominal logistic proceed can be efficiently applied. More specifically, given $$\text{logit}[Pr(Y_1=1|X_1, \ldots, X_k)] = C(0) + \text{Sum}(j=1,k)C(j)X_j \quad [6]$$

where $X_j$ represent original attributes, transformed nonlinear interaction variables, or transformed by a segmentation of a predictor variable, then a maximum-likelihood method can be used to estimate the coefficients, $C(n)$. In a product-optimization project, for example, a stepwise linear discriminant analysis (general location model) may be preferred, if the more stringent assumptions about the response distributions of the variables can be justified.

Consider the general case of the multinomial distribution, $Pr[Y_i|X_j, Z_k]$, where $Y_i$ is a vector of i dependent variables, $X_j$ is a vector of j continuous variables and $Z_k$ is a vector of k categorical variables. But if there is a single dependent binary variable, Y, which has a Bernoulli distribution, i.e., $$Pr[Y=1]=e^L/(1+e^L) \quad [7]$$

where L is linear in $X_j$ and $Z_k$; however, $X_j$ is assumed to be normally distributed. If so, then a two-group discriminant analysis can be applied. If not, then the standard logistic regression, which is not sensitive to the normality assumption, can be applied, i.e., $$\text{logit}[Pr(Y_1=1|X_1, \ldots, X_k)] = C(0) + \text{Sum}(j=1,k)C(j)X_j \quad [8]$$

In general, the model generation platform matches the modeling choice to the characteristics of the dataset and to the project goal at hand.

The next stage 194 is to fit or train the model to the sample subset of the historical data using the predictive variables generated by a set of variable transformation to maximum univariate predictive capability and a set of dimension reduction filters to retain only the most predictive subgroup of variables, including up to a level of interaction, for example, tertiary interactions. At successive stages of convergence of the model parameters, the performance may be evaluated 198 and tested for optimality 200. The evaluation is based on a set of criteria including cumulative lift over the region of interest. If the performance indicates the model is optimal then the model is persisted; otherwise, the sample dataset is enhanced 196 and the process iterated. The enhancement may take the form of higher degrees of interaction. The candidate models are not based on recursive partition/decision trees, which tend to overfit the data, but partition trees can suggest contributory interactions that can be implemented as variable transforms using the predictor variable editor.

Robust Model Assessment

A key to successful deployment of predictive models is the correct assessment of performance beyond the training sample. The model generation platform employs validation and cross-validation and other measures to validate the model selection process that will yield superior target classification performance in the marketplace.

Figure 12:
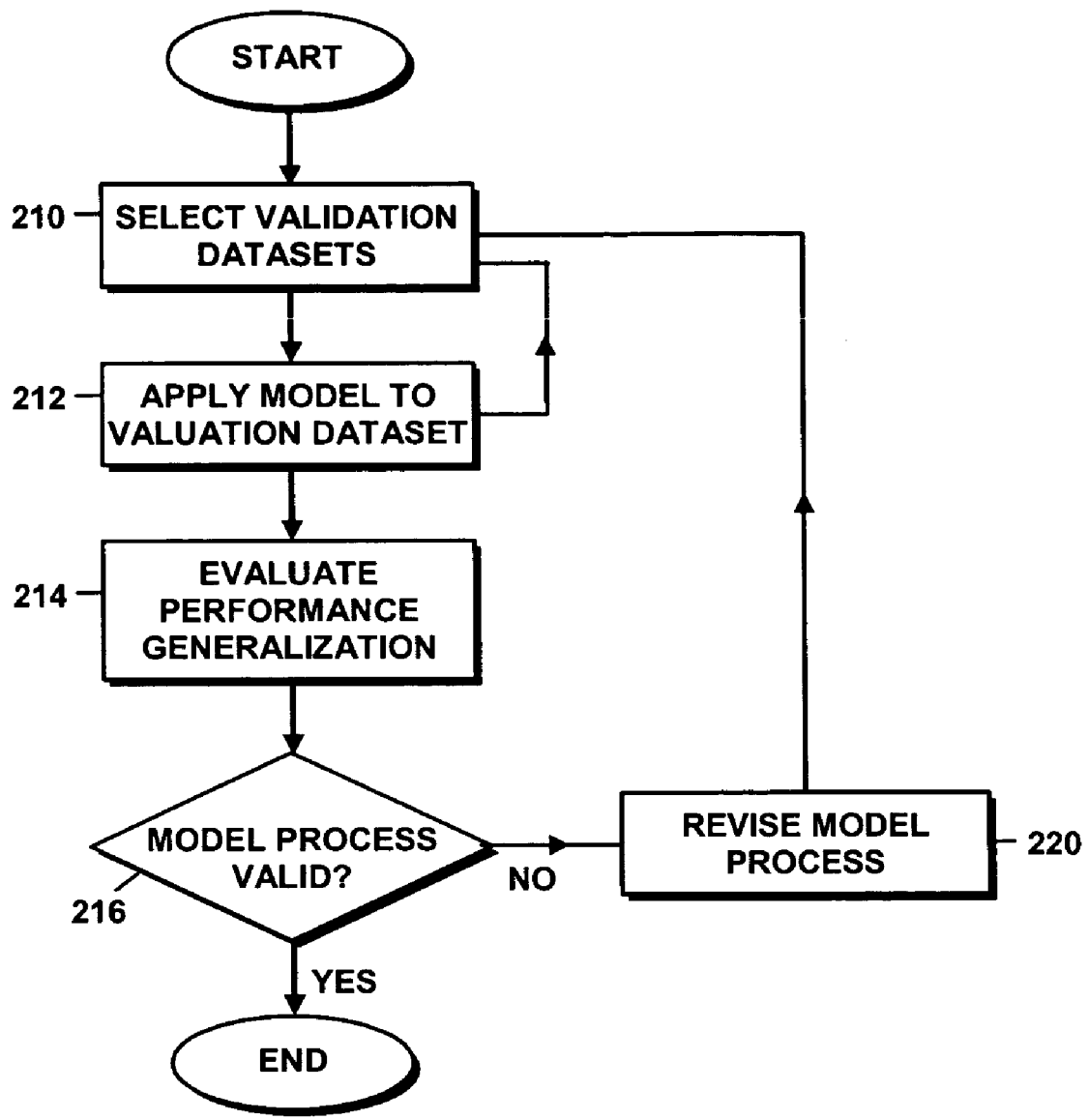
FIG. 12 is a schematic workflow diagram of a model process validation

As indicated in FIG. 12 the model generation platform can obtain the selection of validation datasets 210 by a variety of means such as a pre-specified validation subset or the creation one or more from the development dataset by random sampling without replacement in a single session but with replacement across sessions. The operation of the model generation platform is subject to condition-action rules, i.e., rules of the form:

$$\text{If<Condition>then<Action>} \quad [9]$$

Warning messages are posted automatically, for example, if the number of buyers in the sample is less than 5% or less than 1000 in number, so a second sample can be generated 218 or the model development process continued with the proviso that the model should be carefully scrutinized for robustness.

For the sample dataset selected, cross validation is carried out by 10-fold resampling with replacement in the decision/recursive partition tree phase. After a candidate model has been determined in the model development procedure, the model is applied to the holdout or validation subset for comparison 212. Selected measures, for example, the similarity of the c-statistics (obtained from the ROC curves) and the cumulative and non-cumulative gain functions provide the basis for candidate model validation 214. For particular variables in the model, the chi squared statistic can be used to rank order the significance of the key predictors. Variables that are significant above the 0.025 level may be sample dependent. To militate against that uncertainty, the validation set can be fitted independently and the common variables compared. The congruence of the performances of the candidate model on the development sample dataset and on the validation dataset based on certain criteria validates not just the particular candidate model tested for that dataset but the model development process for that dataset 216. If the model generation process fails validation then the process is revised 220 using model persistence analysis. If the model generation process is determined to be valid then the entire post-sample selection model development process can now be applied to the entire development dataset, not just the sample dataset. The resulting final model, tested for performance, which should be bounded by that of the sample dataset and by the validation dataset, will have superior robustness.

The validation (hold-out) gives an unbiased estimate of performance but with considerable variability. Robust model assessment can be enhanced by bootstrap sampling for model parameter estimation, to expedite the process of linking multiple models. Automated cross-validation of multiple sample selections will identify the variables that are strongly predictive across multiple samples.

A slightly biased but more accurate and complete approach is to perform a complete k-fold sampling for the dataset of size N. However, for discrete valued variables, this is equivalent to a complete subsampling of size T where T=N/k; a more computationally intense approach is to apply the candidate model to samples of size N, with 1 record chosen from the sample dataset and N−1 chosen from the validation (hold-out) dataset.

Model Persistence

For good targeting, the boundaries of validity of a single model's variables should be recognized when different model variables need to be deployed. This can be done by examining a decile-by-decile fit of the model for significant loss of predictive power that would indicate that an interaction with existing model variables has not been taken into account.

The model generation platform automates a modeling process that leads to a candidate model for assessment. Part of that assessment can be an examination of the scored and rank-ordered development dataset for any significant remaining differences between the population of targets (e.g., buyers) and the population of non-targets (e.g., non-buyers) for the development predictor variables. On a decile-by-decile basis, the means for the key predictor variables for the segmented groups can be compared graphically and by using the student t-test for significance. If there are significant differences, interactions with existing model variables may be called for as part of the revision of the model generation process.

Construction of Model Ensembles with Data Weaving

Figure 13:
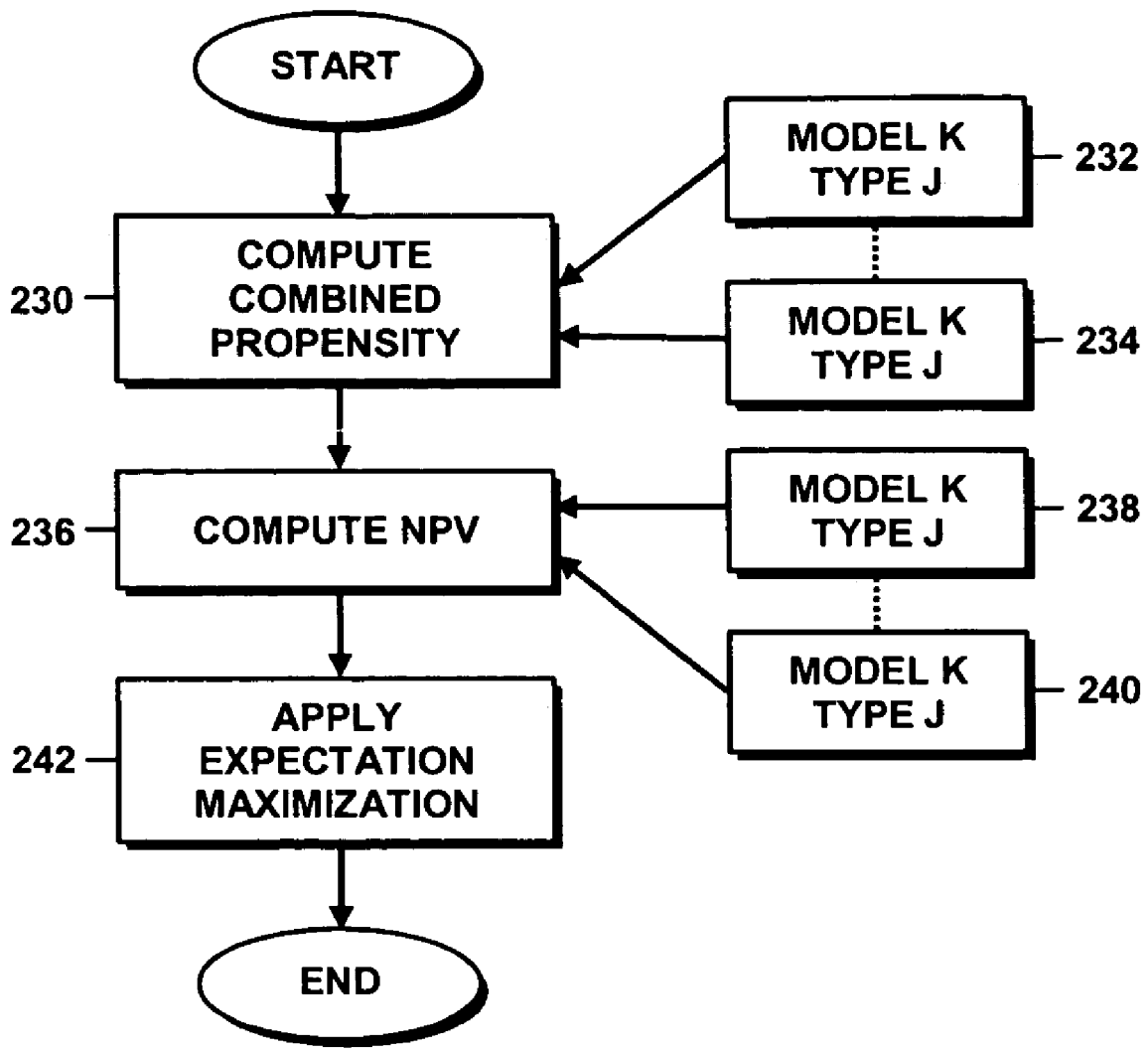
FIG. 13 is a schematic workflow diagram of a model ensemble process

Good predictive models often combine predictor variables from diverse sources, such as demographics and transactions. The model generation platform may combine variables from multiple sources and deal simultaneously with multiple targets as indicated in FIG. 13. One type of predictive model 232 may need to be combined 230 with at least one other predictive model 234 of the same or different type. In such situations, it is important and appropriate to deal with response propensity in order to create cross-modal deciles. The data weaving feature provides normalization for cross-product optimization. Automated cross-product optimization will normalize, without analyst input, multiple models (e.g., product optimization) to compensate for different response rates for each. This will expedite the process of linking multiple models.

The multi-stage models may also be applied, but are not limited to, concatenating models giving propensity of a selected action with risk models indicating likelihood of, for example, payment default, claims risk, or attrition. In another example, the multi-stage models can be applied to concatenate predictions of propensity of a selected action with expected value models predicting, for example, usage level or retention duration. When the multi-stage models include predictions of expected value, aspects of those predicted propensities can be applied in both the derivation of Expected Value or NPV 236 and the calculations that integrate economic data for expectation maximization 242.

The model generation platform using the metadata of the developmental dataset can distinguish demographic variables from transaction variables. Then using the model project variable editor, such variables can be combined. Multiple targets can be accommodated by using as a predictor variable, a nominal variable with discrete values. For example, in a product optimization project, since the overall response rate is maintained in the project table of the database the response can be normalized across products. The predicted product match for a given individual can then be made from the propensity for the product choices. However, normalization is required as shown here:

If $$Pr(Y_i=1|X_{ik}=X_k)=\exp(\gamma_{k0}+\gamma_{k1}\cdot x_k)/[1+\exp(\gamma_{k0}+\gamma_{k1}\cdot x_k)] \qquad [10]$$

then $$Pr(Y_i=1|X_{ik}=x_k)=[\exp(\gamma_{k0}+\gamma_{k1}\cdot x_k)/[1+\exp(\gamma_{k0}+\gamma_{k1}\cdot x_k)]/s/F_i \qquad [11]$$

where $F_i$ is the frequency over sampling for product i.

For the appropriately computed propensity, economic data, such as the cost of sales, variable marketing cost, the cost of goods, purchaser usage level, and/or the expected retention by the purchaser, may be added to derive the expected value or net present value of a potential purchase 236. Additional predictive models of one 238 or more types 240 may be used to determine the predicted retention of a subscription service, or the predicted length and magnitude of an interest bearing agreement, that will enable computation of profitability or the optimal strategy to maximize profits using expectation maximization 242.

Customer insight The model generation platform provides a series of actionable reports profiling customers' past and future behaviors. In the context of product marketing, these reports, derived from predictive analytics, yield a feature spectrum, for example, on customer segments for generating creative marketing development, mass marketing promotions, marketing planning, and product development.

Figure 14:
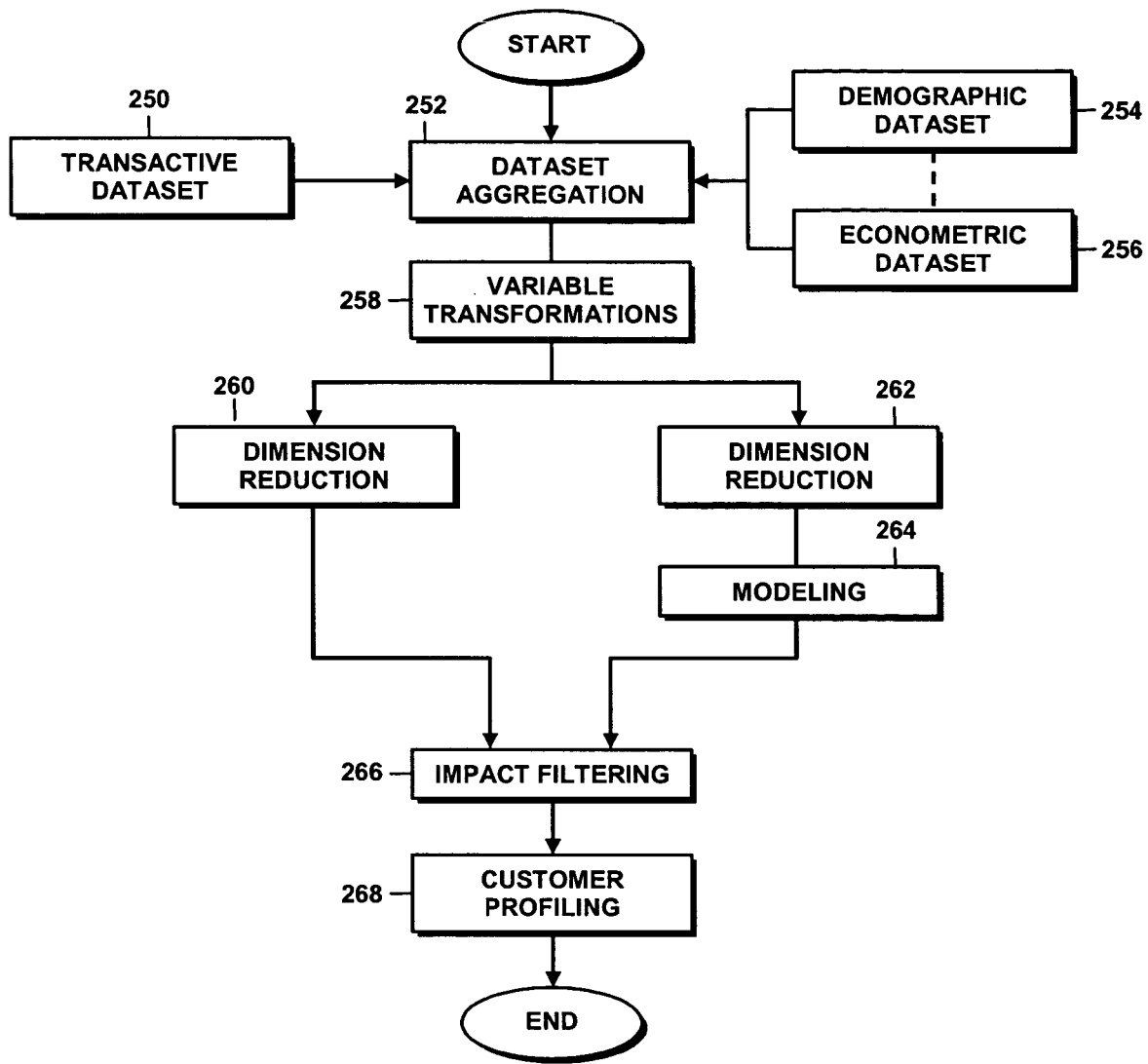
FIG. 14 is a schematic workflow diagram of a customer insight analysis

As indicated in FIG. 14, the model generation platform includes a facility for computing customer insight based on ranked profiles of the key predictor variables and comparisons of the averages for the key predictor variables for buyers and non-buyers or other form of target segmentation. The insight process starts with the aggregation of datasets 252, such as transaction and communication data 250, demographic data 254, econometric data 256 and other data bearing on customer's past and future behavior. The aggregated dataset undergoes transformations of variables 258 that augment predictive power relative to the selected outcome dependent variable. One method of ranking 260 that sets aside the variable interactions is to using univariate regression analysis to compute the c-statistic from the ROC curve. This plots q over the range (0,1) for $$q=1-F(G^{-1}(1-p)) \qquad [11]$$

where F and G are the cumulative frequency distributions of the buyers and non-buyers. The rank order of the key predictor variables derives from the magnitude of that AUC (area under ROC curve). The semantic interpretation of that variable comes from its description in the project data dictionary of FIG. 2. The unweighted arithmetic means of the variables for buyers and non-buyers are used for the graphical comparisons. The first method may have the advantage of a simple interpretation of predictor variables in terms of prospect attributes.

Another method uses the predictive modeling process to obtain a reduced set of relevant predictor variables 262 that generate a predictive model 264 on that reduced set. The second approach has the advantage of providing estimates of future behavior and may be used to profile coherent groups of prospects, not just past customers.

For the resulting sets of predictor variables the impact upon the prospect population must be computed 266 to obtain the most useful ranked set. For example, a particular variable may be highly predictive of behavior but only expressed by a small subset of the prospect population. In another example, economic data associated with the profiled population can be utilized to compare the value, for example expressed as net present value, of customer cohorts exhibiting affinity for a designated product or service. One strategy is to rank the variables in terms of size of impact, strength of predictability, and ease of interpretation to obtain customer profile 268.

The Model Generation Platform Workflow Orchestration

The model generation platform includes a rule-driven analytic workbench that assists analysts in developing optimal predictive analytics models by automating data cleansing and merging, data transformation, model development, model development process validation, model regeneration and refreshment, and generating and executing runtime models (which can also run standalone outside the model generation platform). The project framework for model construction incorporates all information needed for the model but include datasets by reference only, records model design decisions and comments for process improvement, and automates model development, e.g., from templates and process flow.

The Advantages of the Project-Based Model-Generation Platform Include the Following:

1) Rapid Model Development

In contrast to scripting tools often used for model development, the model generation platform does not require the composition (or debugging) of code but uses instead the context of a point-and-click structured graphical user interface. This lays the foundation for rapid model development and robust, reliable deployment.

The model generation platform automates the workflow underlying the development of a predictive model in a consistent, reproducible way. To guide the process, interim real-time reports of the state of development are generated and retained as a permanent part of the model project. To accompany the scored list, an additional class of real-time reports is generated summarizing the interim reports and including the scoring function. Although the development dataset, scoring dataset, and scoring list whose size warrants archiving are referenced by pathnames, the scoring function and all relevant information needed to refresh the model on a going-forward basis are contained in the project folder.

2) Integrated Data Management

The model generation platform is designed for straight through processing (STP) of customer data records (CDRs) from input, to modeling, to scoring and the deployment of actionable lists. For sensitive information, the model generation platform employs an encryption library so that, for example, the commercial standard TripleDES encryption is built into list scoring post-processing.

Figure 15:
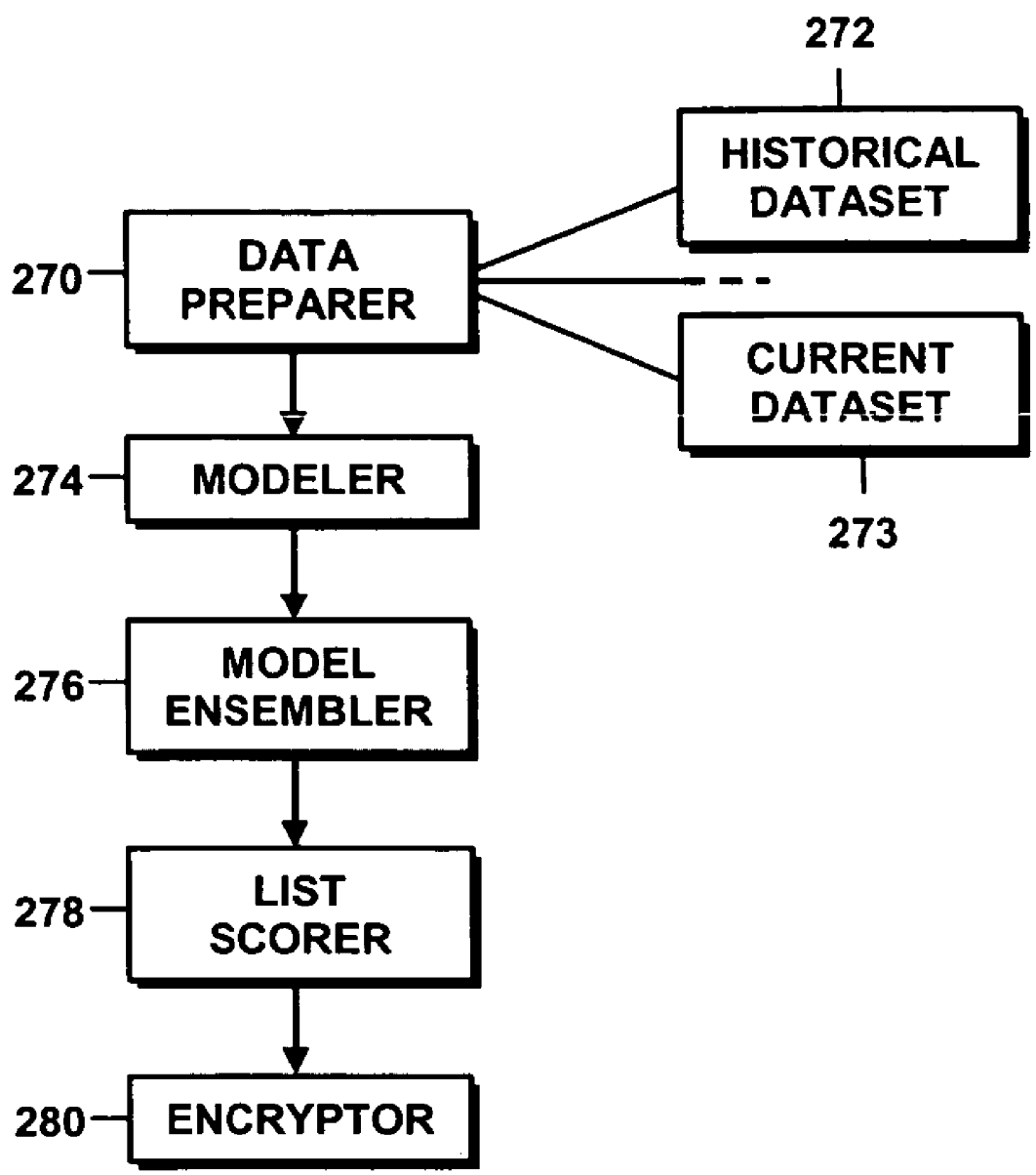
FIG. 15 is a schematic component diagram of modules in a model development process

The model generation platform has access to a full suite of modules for importing scrubbed data, transforming the variables into usable form, then generating customer insight and scoring lists As shown in FIG. 15, the modules can be combined to generate a straight-through model generation platform pipeline for a particular project workflow task using the project database to orchestrate the workflow. Data preparation 270, which involves data cleansing, data aggregation, and variable transformation, operates on historical datasets 272 as well as current datasets 273, with outcomes to be computed 274 by one or more models 276 then applied, assemble a scored list 278, some or all of which may require encryption 280.

3) Scalability

Using a project-based model generation platform of the kind described here, as the number and complexity of modeling projects increase, the time required for modeling, represented by workflow, data transformation and modeling does not increase beyond available resources. In typical situations it is not even a critical-path segment with respect to activities of a business for which the modeling is being done, such as a marketing campaign.

4) Integrated Information Management

Efficiency is improved in the modeling process by enabling analysts to enter the modeling task bar process at any step to modularize the modeling process (e.g., dimension reduction used for quick evaluation of a dataset).

Server pipelining may be enhanced to be able to handle a large number of concurrent active models and new products incorporating models. Scalability in the model generation platform server is built into the architectural design and configuration of the software and hardware. One example of a model generation platform is as a multithreaded application with component architecture that, for example, takes advantage of multiprocessor technology and runs under the cluster-capable Advanced Server Windows 2000. Features that tune the software for scalable performance include synchronous I/O support, concurrent scoring, server multiprocessing, high availability, server clustering, and lights-out management.

Model Development Process Flow

Figure 16:
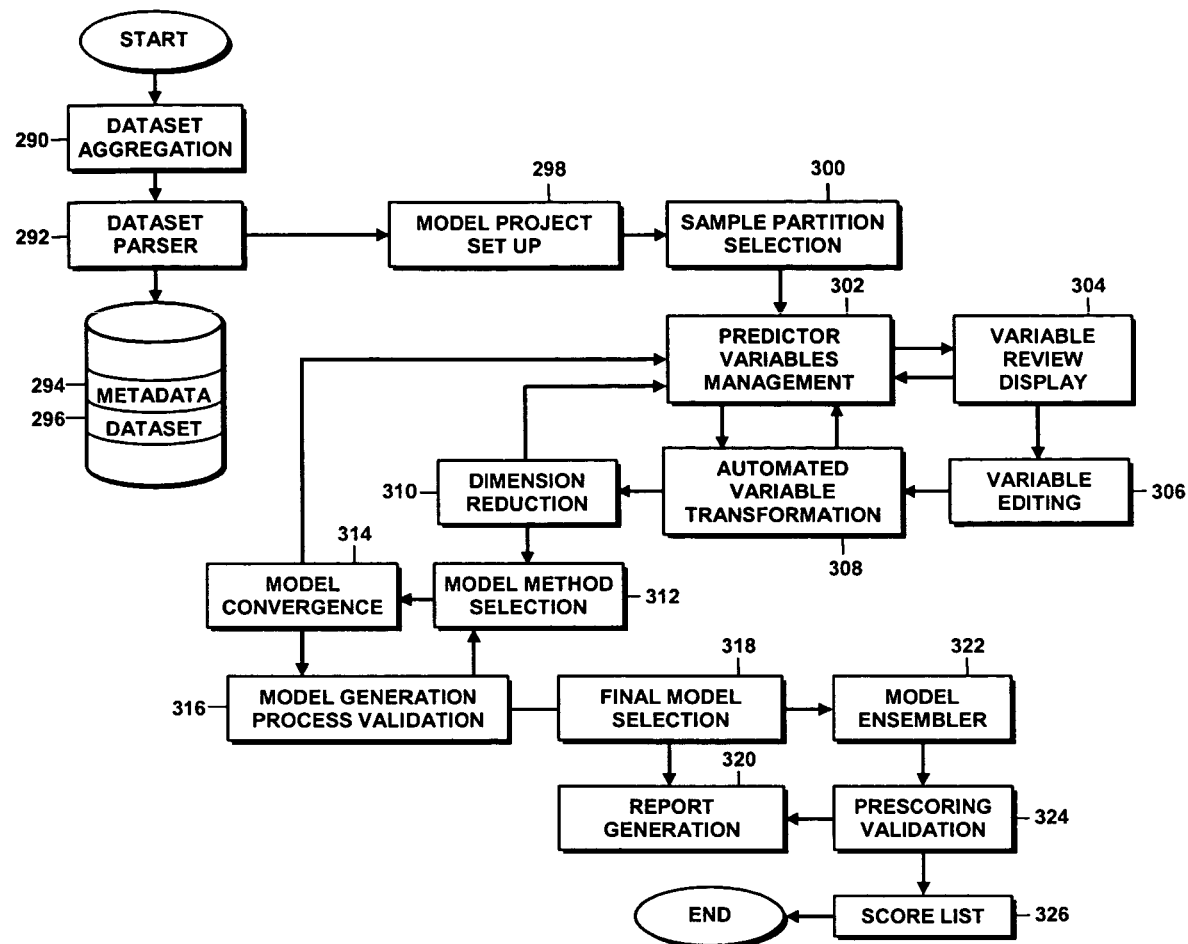
FIG. 16 is a schematic diagram of workflow in a dataset preparation and a model development

As shown in FIG. 16, predictive analytics is a business process with sequences of complex stages leading to a scoring model. The stages can be represented as a sequence of actions performed on the data that guide the subsequent processing. A variety of scenarios of use by an analyst depend on the task in which the analyst is engaged. For each of several example scenarios, the sequences of actions are discussed below. In FIG. 16 the appropriate historical datasets are aggregated 290 and then parsed 292 to obtain the model development dataset 296 and the corresponding metadata 294 that is used by the model project during model project set up 298 and throughout the modeling process. The development dataset is first partitioned 300 to obtain a training sample. Then the training sample dataset is reviewed 302 at the individual variable level 304 and transformed 306 or reviewed in terms of the set of predictor variables using partition binary trees and automatically transformed 308 into variables suitable for dimension reduction 310. For the reduced set of predictor variables a model method is selected appropriate the data type and outcome 312 then applied to the dataset 314. The validity of the model generation process is evaluated 316. If the process does not validate the dataset and model type are revised. If the convergent process validate then the final model selection is applied 318. The model process results are displayed in report form 320 or lead to actionable model ensembles 322. The results of prescoring validation 324 can be reviewed as a report and persisted before making the commit for a score list 326.

Model Development Guide

Figure 17:
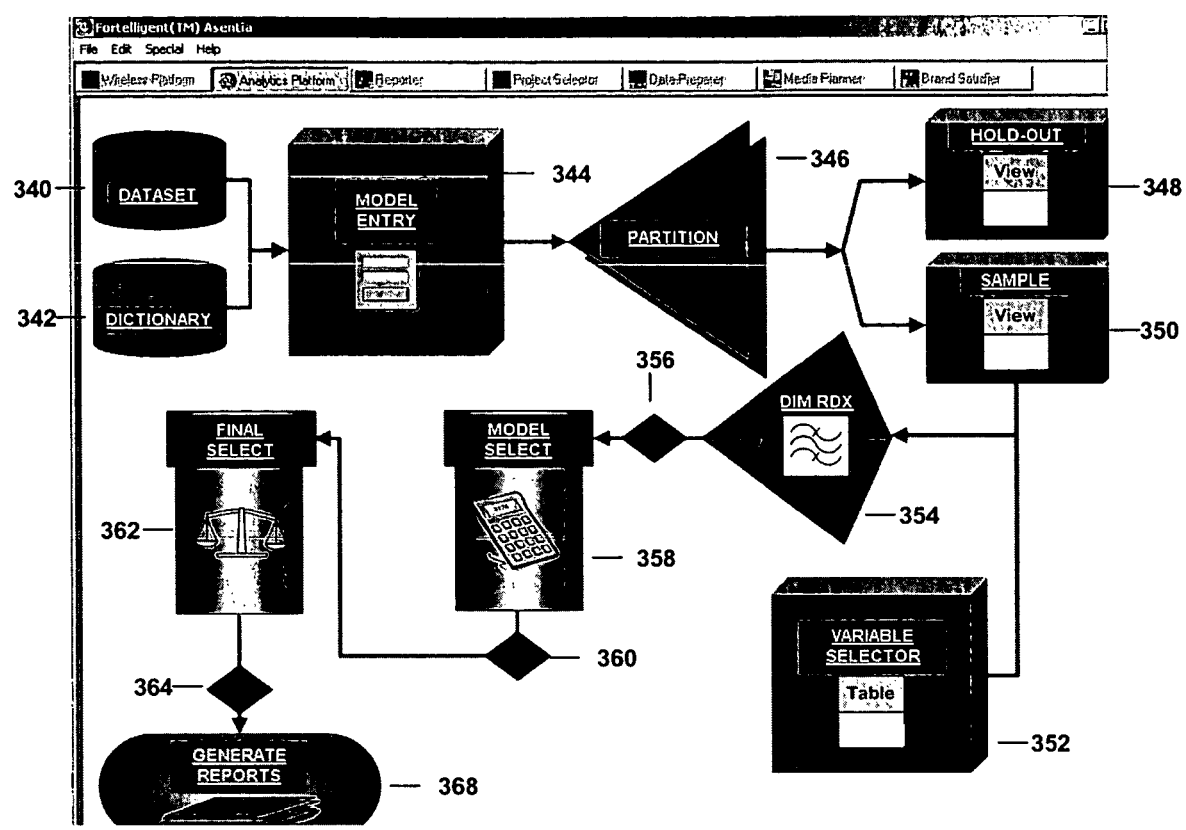
FIG. 17 is a screen display of a user interface.

Corresponding to the workflow of FIG. 16 is an iconized representation viewable by the user in stages that serves as the overall interactive model development process guide as shown in FIG. 17. The diagram shows the development path starting from dataset selection 340 and the accompanying metadata dictionary selection 342 as part of the model project initial entry 344 corresponding to 298 of FIG. 16. The next stage, corresponding to 300 of FIG. 16, is the partitioning 346 of dataset into a training sample 350 for the model and one or more hold-out samples 348. The subsequent stage, corresponding to the predictor variables management 302 of FIG. 16 and its auxiliary substages 304, 306 and 308, is the variable selector 352. Directly corresponding to the dimension reduction 310 of FIG. 16 is 354 of FIG. 17. The choice point 356 indicates the options available at the dimension reduction stage 310 of FIG. 16 to apply more stringent filtering, to revise the pool of predictor variables 302 or to advance to model selection 312. The model selection stage 358 in turn provides options 360 corresponding selecting a different model from the library of appropriate models 312, to revision of the pool of predictor variables 302, if the model convergence 314 did not attain project goals, to validation of the model generation process 316. Subsequently, the final selection stage 362 includes the validation of the model generation process 316 and final model selection 318. Following the final select 362 the choice point represents the options of generating reports 368 corresponding to step 320 of FIG. 16, or generating more complex model with model ensembler 322.

In addition to the rule-guided canonical path of FIG. 17, the analyst can make use of the re-entrant properties of the interactive process guide. The candidate model can be revised or a new model project initiated by clicking on the underlined hyperlink labels. The analyst can double-click on any of the underlined hyperlink labels. Double-clicking on the dataset hyperlink enables changes in the selection of the dataset file; similarly, for the dictionary hyperlink. Double-clicking on the model entry hyperlink enables viewing or editing of the model project description. Double-clicking on the highlighted partition hyperlink allows the analyst to progress to the next step in the model development process. The model generation platform embeds a knowledge/experience base in the choice points and paths.

Model Generation Platform Launch: Analyst Creates a New Model

In this scenario, the analyst launches the model generation platform application. The immediate result is the launch of a new model project resulting in the display of the model entry form dialog as shown in FIG. 18A, which, for convenience, is an example for a binary response model.

Model Project Initialization

The model project entry form of FIG. 18A is used to initiate the model project by collecting basic information to track and document the modeling development process. The model project entry form first obtains background information about the model project such as the designated name, the type of model to be developed, and the objective to focus upon.

The model project is based upon an associated dataset, which has an associated dataset dictionary. The user can browse to the file path for the development dataset and to the development dataset by clicking on the browse datasource button 370 and the browse dictionary button 372. Open file dialogs are used to choose the appropriate file paths. Selection of the data dictionary database (e.g., DataDictionary1.mdb) displays the dictionary table on the entry form as shown in FIG. 18B. From among the variables in the particular dataset, one variable should be selected as the outcome variable [dependent variable], e.g., Current_purchase, which can be predicted from the remaining available predictor variables. The user may select that variable by clicking on the appropriate row, which causes the variable to appear in the dependent variable dropdown list 374. The selected variable is now identified as the dependent variable (and is excluded from the predictors, i.e., Status is XP).

After completing the selections for the candidate model properties and model constraints which serve as descriptive guides or embedded filters parameters for selecting a final model, the user clicks on the submit button 376 to merge the dataset dictionary and dataset into the internal representation and compute basic statistics.

After the analyst clicks on the submit button 376, the model generation platform sets up the project structures (including the project table) and performs consistency checks, for example, matching the data dictionary and the primary dataset. After the metadata has been applied to the development data set, the iconized development guide, shows the completed steps and indicates the next step, partitioning. Completed steps are linked by lines of one color index (green) but current incomplete steps are linked by a second color index (red). The guide starts with the earliest steps that have been performed and ends on the right with the next step to be performed, rather than showing all possible future steps.

Splitting Sample Dataset from Validation Datasets

The next stage involves creating sample datasets by random sampling. The model generation platform then creates views of the original dataset that constitute the sample and validation dataset(s) and represents them in the iconized workflow display within the two boxes for the hold-out and sample datasets. The model generation process automatically advances to the next stage of model processes, that of data exploration, understanding and transformation, where the tools of the platform synergistically interact with the experience of the analyst and provide variable transform automation.

Dataset Exploration, Understanding and Transformation

Figure 19:
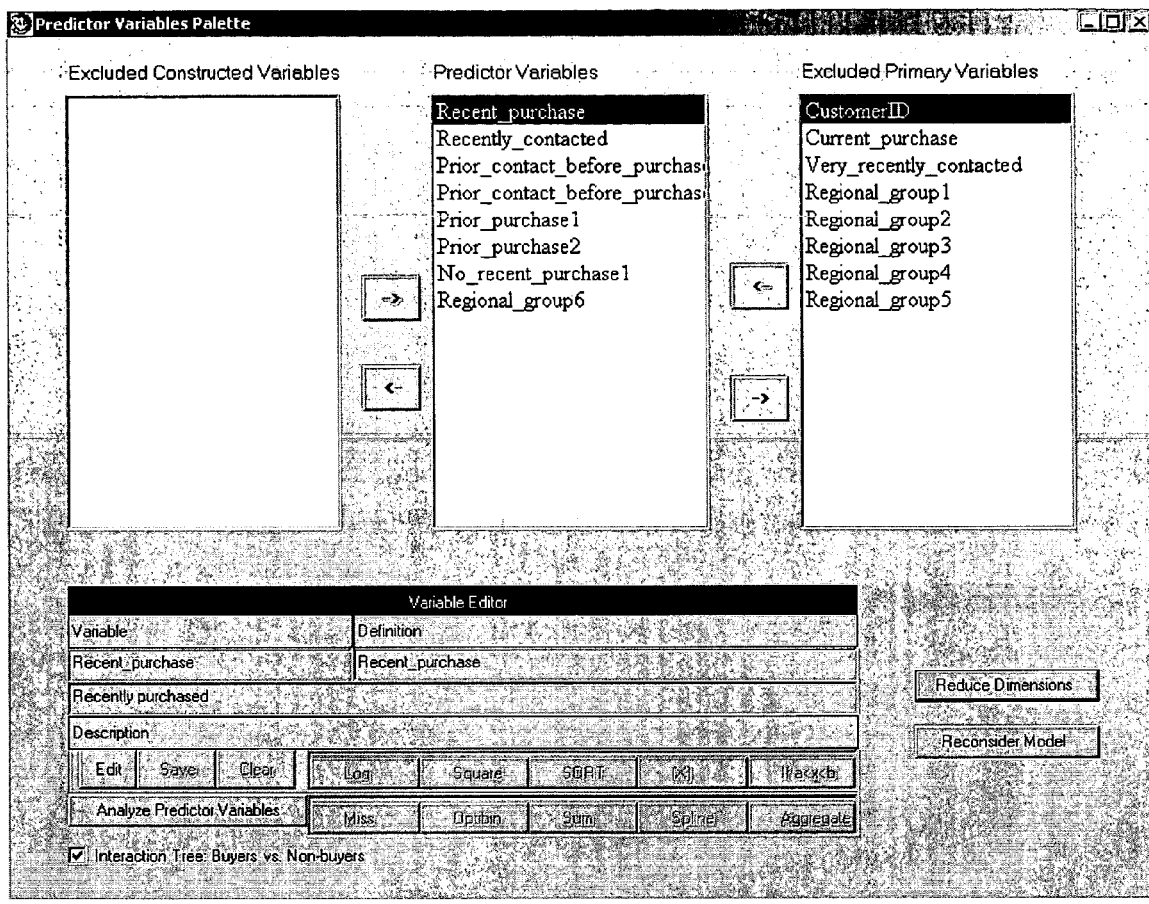
FIG. 19 is an exemplary graphical user representation of a predictor variable display and a transformation editor.

The model development process subsequently examines overall significance of the variables and their potential interactions. Even if the datasets presented to the model generation platform have been aggregated and splined there may be nonlinearities and interactions that can contribute significantly to the model. The predictor variables palette shown in FIG. 19 provides a way of examining such interactions:

Predictor Variable Review

Next step 4 is variable selection and editing. The analyst is presented with the predictor variables palette of FIG. 19, which shows the predictor variables that survived the filtering for non-contributory variables (in the column headed "predictor variables"), together with the non-contributory variables, which either are in original form (headed "excluded variables") or generated by a construction procedure such as a decision tree split, OLS product, or cross product (column "excluded constructed variables").

This palette allows the analyst to examine individual variables, construct additional candidate variables, and classify each variable into one of the three columns. By selecting a variable (or by clicking on the select all button), the analyst can use the arrow buttons to redistribute the variables. Only the predictor variables in the center column are carried forward in the subsequent steps of the model development process.

The predictor variable palette shows the status of the variables in the sample dataset (FIG. 19). Except for initially excluded variables as indicated in the dataset dictionary, such as CustomerID, all the primary variables are designated as predictors ("P"). When a dependent variable is selected or a predictor from the set of primary variables, its status changes to excluded primary variable ("XP"). Such variables are displayed in the right hand list. Clicking on one of the variables in the list presents the basic features of that variable in the variable editor.

In FIG. 19, clicking on the reduce dimension button presents the analyst with the dimension reduction dialog. If dimension reduction is not required, the user clicks on the reconsider model button to display the model selection palette of FIG. 23.

After creating one or more new transformed variable, the user clicks on the revisit reduction button to return to the dimension reduction stage to refilter the set of predictor variables but the result may be unchanged.

Alternately, the analyst can reprocess the variables by clicking on the revisit (dimension) reduction button to reduce the dimensionality of the model dataset using the newly created predictor variable in the pool of candidate variables. Either the same or a different reduction method can be used or further reduction can be omitted to progress to the model selection process of determining the best predictor variables and the model regression equation that provides the response prediction.

The predictor variables palette dialog of FIG. 19 presents the analyst with three columns representing the three functional states of a variable for the modeling process. The center list contains those variables that are the potential predictor variables of the model. Most of the dataset variables will initially be in that potential predictor state represented by P in the Status column of the Data Dictionary. The left-hand list will display transformed variables, i.e., those constructed by transforms of other variables; however, specifically those transform variables that have been temporarily excluded from the set of predictor modeling variables. The right-hand list will display a second set of variables excluded from the set of predictor variables, such as the dependent or target variable. When the analyst clicks on a variable in one of the lists the information from the Data Dictionary associated with that variable is displayed below along with a hyperlink to graphical information on that variable.

The predictor variable palette shows the status of the variables in the sample dataset (FIG. 19). Except for initially excluded variables as indicated in the dataset dictionary, such as CustomerID, all the primary variables are designated as predictors ("P"). When a dependent variable is selected or a predictor from the set of primary variables, its status changes to excluded Primary variable ("XP"). Such variables are displayed in the right hand list. Clicking on one of the variables in the list presents the basic features of that variable in the variable editor.

Variable Visualization

In addition to the information from the data dictionary, the selected variable is graphed in terms of the response frequency of the target dependent variable. By clicking on the hyperlink the graph is displayed as shown in FIG. 20B:

Such variable visualization provides a basis for transforming variables to predict more robust target performance. This is particularly effective for nonlinear continuous variables, for multi-valued nominal variables whose effectiveness can be improved by splining, and for variables with significant interactions with other predictor variables, such as those revealed by the partition tree plots.

Variable Transformation

Figures 21A, 21B, 21C:
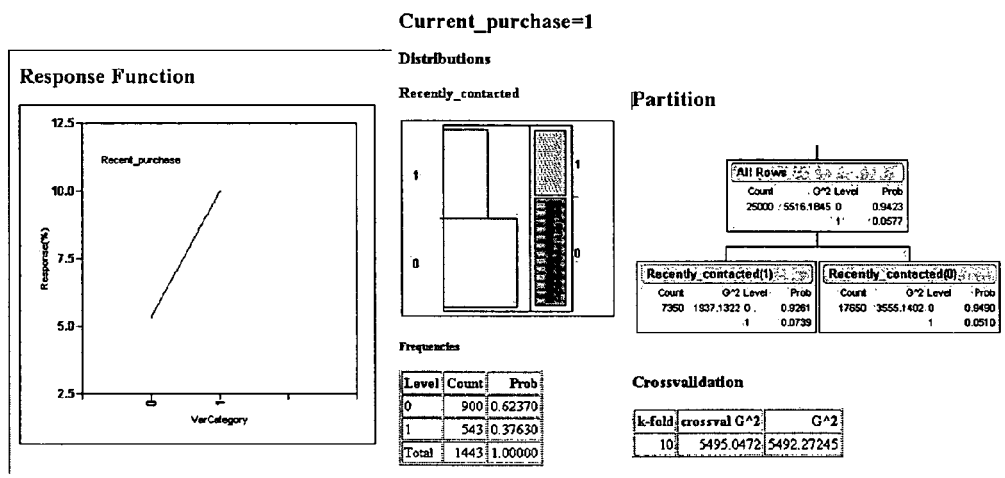
Figure 22:
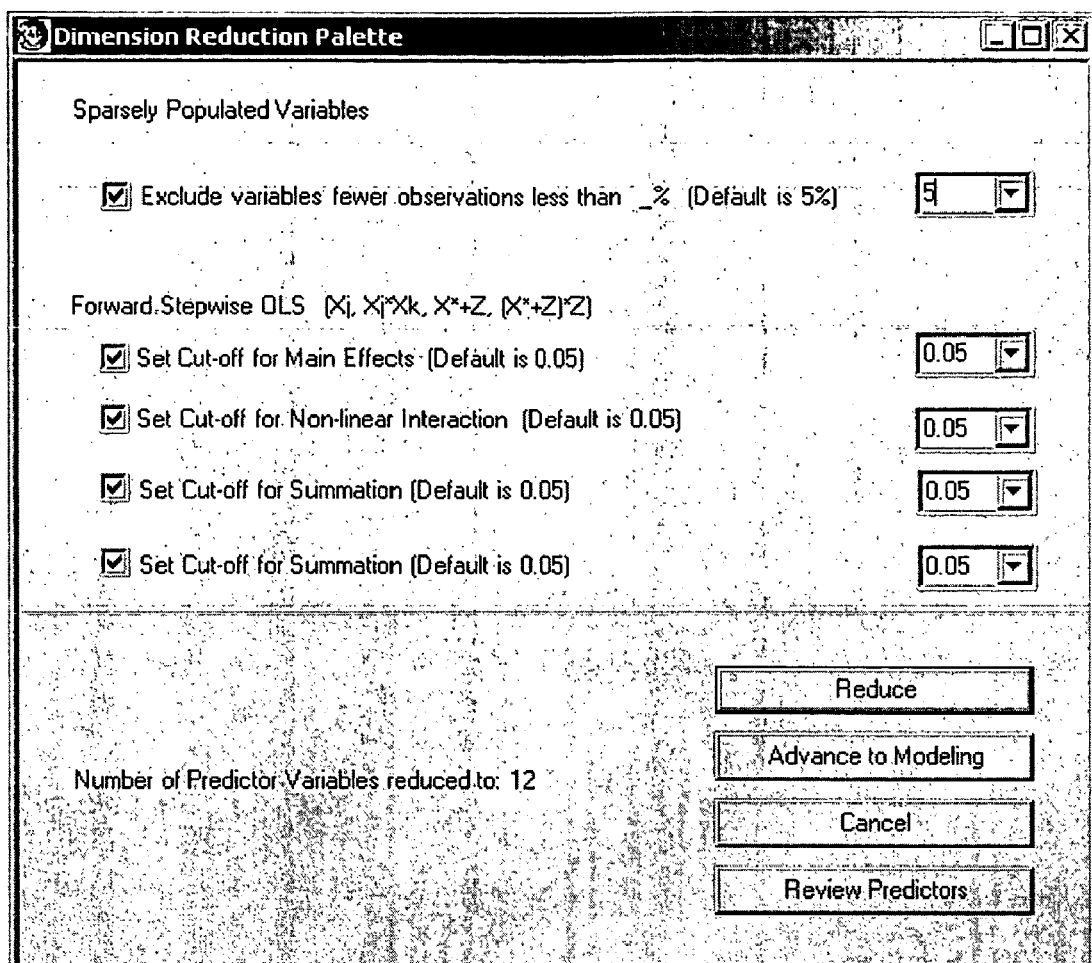
FIG. 22 is an exemplary graphical user representation of a dimension reduction interactive dialog form showing five (5) stages of variable exclusion.

For a selected variable, the major variable transforms (logarithm, square, square root, interaction) can be applied. To obtain an interaction transform, the user clicks on the edit button then on the interaction (X) button as shown in FIG. 21A. Then, in the predictor variables list, the user clicks on the prior_contact_before_purchase1 variable to generate the transform variable shown in FIG. 21D. The entries are automatically generated but the variable description can be edited manually. After clicking on the save button and new variable Prior_Purchase_I appears on the predictor variable list which when selected shows the new set of features as shown in FIG. 21E:

After creating one or more new transformed variable, the user clicks on the revisit reduction button to return to the dimension reduction stage to refilter the set of predictor variables but the result may be unchanged as shown in FIG. 22. Action point 3 is variable transformation. By double-clicking on a variable in the variable palette, all the information about that variable can be displayed, including its definition as shown in FIG. 21A. The analyst can modify that definition to create a new variable by using a functional transform, e.g., logarithm or square root, window mappings to exclude outliers, e.g., x<13.0, or splines. Splining is a special case of variable transformation and has an auxiliary window for graphically determining the knots.

Distribution analysis is available for the variable in terms of descriptive statistics and graphs and relative to the target variable. Moreover, automatic partitioning of a single variable into more predictive components can be carried out or the interactions among significant variables in the full predictive set can be revealed. For the subset of predictor variables under consideration a descriptive analysis can be obtained by selecting the first distribution analysis checkbox; differential effects can be examined by selecting on the second distribution analysis checkbox. The user may select the interaction tree checkbox to examine potential variable interactions.

Figure 20A:
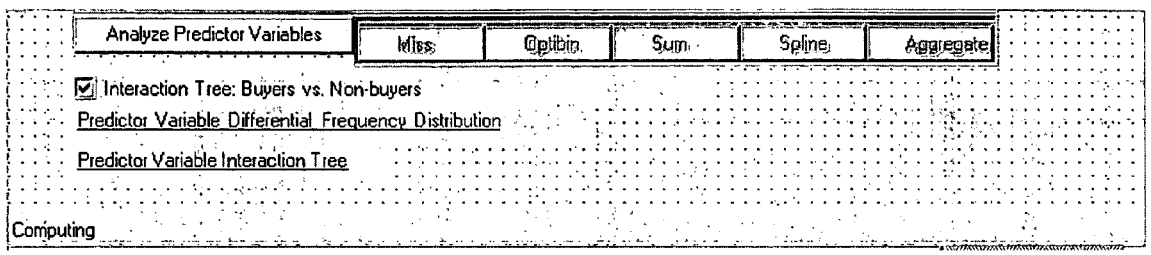
FIGS. 20A and 20B is an exemplary graphical user representation of an invocation of an interaction tree to analyze predictor variables.
Figure 20B:
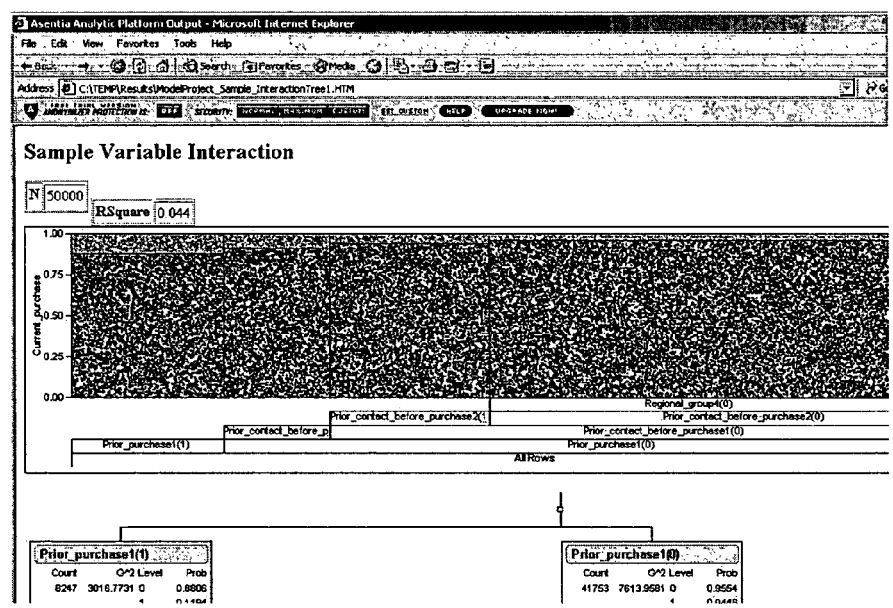

When the displays have been computed, hot links to the distribution analyses and decision trees in HTML format are shown on the palette as illustrated in FIG. 20A.

Clicking on an exploratory statistics hotlink launches a browser to display the linked HTML as shown in FIG. 20B for the sample variable interaction tree.

The partition analysis shows a graphical representation of the 50,000 records (non-buyers at the top and buyers at the bottom) using the most significant variables as determined by a log likelihood measure whose bifurcation will split the sample into a binary decision tree.

Since the partition beyond a certain depth often overfits the sample dataset, a restriction is place on the procedure so that the small half of a split must contain at least 10% of the parent set.

To test for robust generalization, a k-fold cross-validation is performed using the log likelihood ($G^2$) statistic to indicate overall fit. There is a trade-off between number of subsamples and random variability (noise) but typically between 5 and 10 is satisfactory. In the model generation platform, a 10-fold cross validation is performed and by that test, the partition tree is robust.

After the variable have been examined or edited, sample frequency and/or interaction displays have been reviewed, the user clicks on the proceed button to advance to the dimension reduction stage. As a background task, the model generation platform can impute missing data for suitable categorical and continuous variables, when requested, apply Bayesian Renormalization and then and use the $G^2$-values to optimally partition highly multi-valued categorical variables.

Dimension Reduction Stage

Next step 3 is dimension reduction. The challenge posed to the analyst by the complex, multidimensional dataset is to isolate the significant predictor variables for use in a model. Although the dataset has been cleansed, information is not distributed evenly across the variables (dimensions). The process of exploratory data analysis seeks to understand the distribution of buyers and non-buyers across the dimensions, to facilitate the transform of variables since the propensity mapping may be simplified with in a linearized space. Then to make the model generation more efficient, dimensions irrelevant to the propensity mapping can be eliminated or weakly contributory dimensions combined. So dimension reduction acts to reduce the number of dimensions by excluding variables that are not relevant.

There are three general approaches to reducing the dimensions of the space in which to develop a predictive model, which are made available to the analyst in the dialog box shown in FIG. 22. First, the observational data may be lacking for certain covariates rendering them inefficient. When missing data are not ignorable and cannot be reliably imputed then the corresponding sparsely populated covariates below some cutoff point may be discarded without loss in generality for a first-pass model. Second, ordinary least squares regression (OLS) applied to the Bernoulli distribution of the dependent variable for linear, quadratic forms of individual covariates can be selected using the probability of the t-ratio greater than some relaxed criterion, such as 0.05. Discarding the variables that fall below the criterion will reduce the dimensionality of the model space and in this lower dimensional space of significant variables; the interaction cross products can be similarly sorted and culled. However, the dependent variable may be very non-linearly related to one or more covariates so may be prematurely set aside, if the cutoff criterion is set too high or the relationship is too nonlinear. Third, the decision tree of the data exploratory stage will have suggested any complex interactions as such machine learning classifiers can deal with complex regions within covariates but may over fit the observations, if the trees are expanded too deeply. Therefore, restricting the nodes to those of a certain size above some cutoff point will generate potentially significant transformed covariates.

When the analyst selects the reduce dimension button after adjusting the density cut-off indicator level, the variables that fall below the cut-off line are excluded from further modeling consideration. (Such variables receive the status 'XP' but later in the process with additional missing data imputation; the analyst can re-include the variable based on other considerations.) A count of the number of remaining variables is displayed for confirmation.

Through a set of filtering procedures indicated below the purpose of this stage is to exclude a sufficient number of the non-significant variables that the modeling can proceed efficiently with procedures, such as stepwise OLS (Ordinary Least Squares) regression. In addition to the first filter that eliminates sparsely represented variables there are other variables that may include: a second that uses stepwise forward OLS with the t-ratio as the fitting statistic (Prob $|t|$<cut-off criterion, e.g., 0.05); a third, that uses stepwise forward OLS with all binary interaction terms $(X_j*X_k)$ filtered with the same technique; a fourth that generates by forward stepwise OLS all combination of the augmented sets of variables, $X^*$, summed with the set, $Z$, initially rejected variables, e.g., $X_h$ or $(X_j*X_k)$ filtered with the same technique; a fifth one that generates all interactions of $X^*+Z$ with $Z$, using stepwise forward OLS filtered with the same technique with all as used as a cut-point or a ranking measure; with all terms summed with the initially rejected variables filtered with the same technique. After the particular filter regimen has been selected in FIG. 22, the user clicks on the reduce button or hits the return key. Upon completion, a count of the number of remaining significant predictors is shown as in FIG. 22. To review the status of the predictor variables, the user clicks the review predictors button.

Model Generation

Figure 23A:
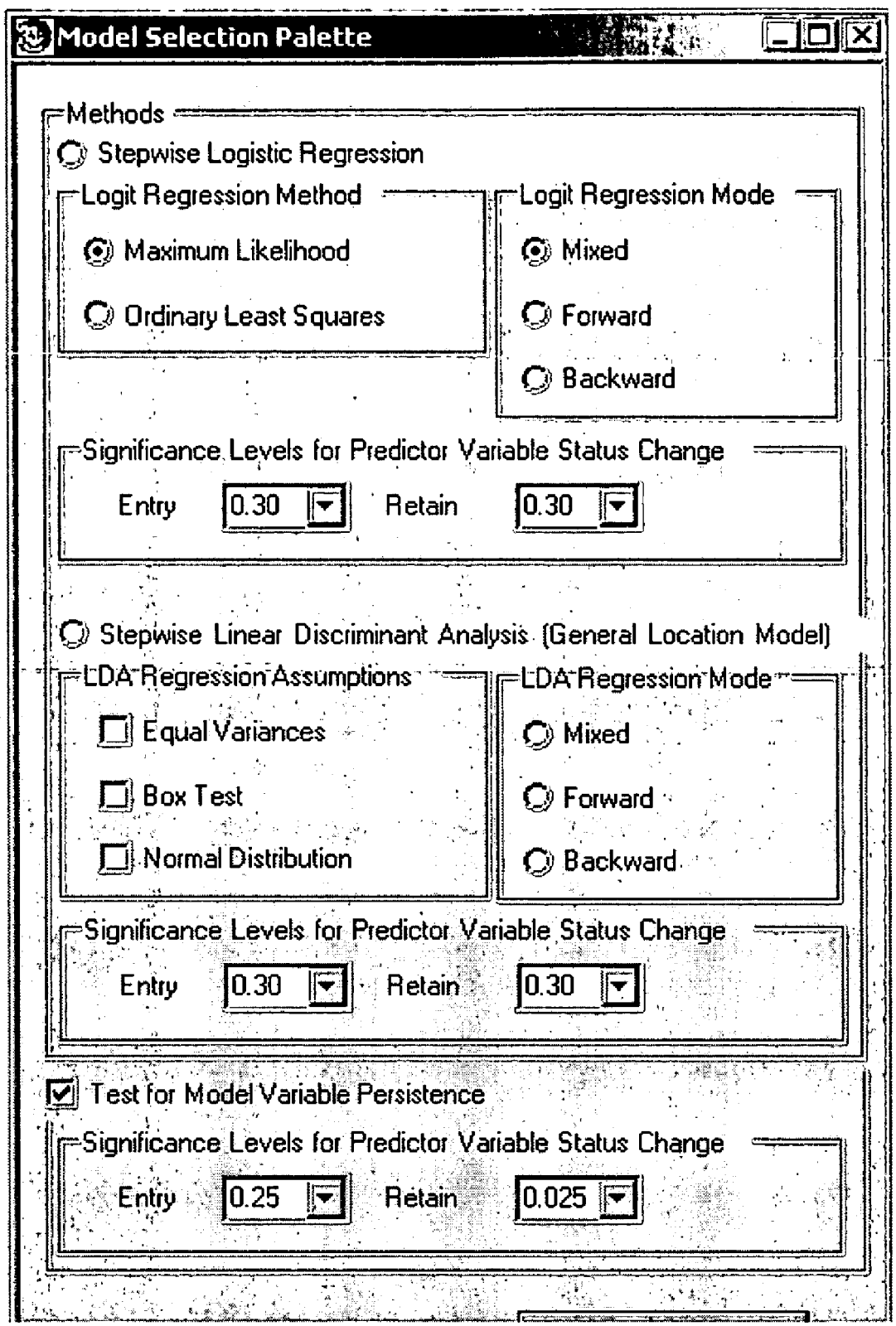

Next step 4 is the prediction method. When the analyst double-clicks on the model select icon, a selection of several model-building approaches is displayed as shown in FIG. 23A. The analyst progresses by choosing the prediction method (and the criteria to exclude non-contributory variables), e.g., stepwise logistic regression. The modeling results are displayed using hyperlinks and if the criteria for a satisfactory Candidate model are met, e.g., $c>0.7$ then a proceed to validation button is clicked. If the Candidate model is accepted, all variables except for the predictor variables used in the model are moved to one or other of the excluded variable columns. If a Candidate model is rejected, the data exploration and variable transformation action points are still available for modifying variables to improve the model.

As an example, to select a method, the user clicks on the stepwise logistic regression method radio button, then, selects the fitting criterion by selecting the maximum likelihood method. For stepwise fitting there are three approaches: forward, backward, and mixed. For example, the analyst can elect the backward approach, in which all the variables are entered but then eliminated if not significant, by clicking on the backward radio button. Then set the entry significance level combo box and the retention significance level combo box levels to say 0.25 and 0.025. For the backward approach the critical level is the retention level, which should be set at 0.025 or below since at the 0.025 level, a spurious variable with no actual predictive power will be accepted with a 2.5% probability. After completing the parameter settings for generating a candidate model, the user clicks on the generate model button (FIG. 23A).

The model selection method for the dataset example uses stepwise logistic regression to obtain an optimal set of coefficients for the variables that are significant at the 0.025 level or below. When the process is complete, links appear to the results. The user clicks on the first hyperlink to have the browser display the model candidate statistical results, specifically, the model parameter estimates and the ROC Curve, which gives the concordance statistics as shown in FIG. 23B.

Click on the second hyperlink, Model_Candidate_Lift_Chart, to display the non-cumulative gains chart for the dataset sample.

Model Gains for Sample

The model candidate lift chart shows a significant lift in the top deciles and a smoothly declining lift overall. The user clicks on the third hyperlink, Model_Candidate_Persistence_Chart, to display the Key variables for the dataset sample, for example, as shown in FIG. 23C.

The persistence chart for this variable indicates that there is no significant interaction with other variables in the model that has not been accounted for. Because the model shows promise, to test further the user clicks on the advance candidate button.

Alternately, if the model candidate did not meet the necessary criteria, clicking on the review predictors button will display the predictor variable palette (FIG. 19) where new transformed variables can be constructed to attempt to develop an improved model candidate.

Model Generation Process Validation

Figure 24:
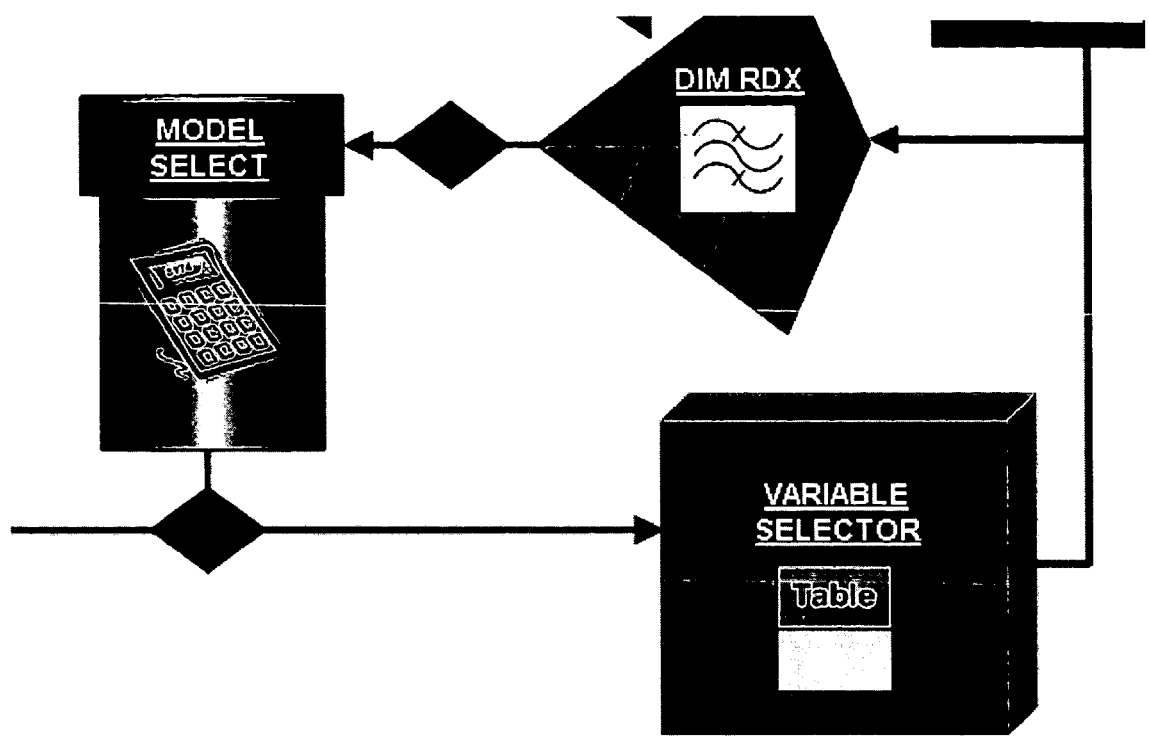
FIG. 24 is an exemplary graphical user representation of a model selection interactive dialog showing decision options available after model parameter optimization.

FIG. 24 shows the iconized guide view of the choice points for returning to review the predictor variables if the model is not satisfactory. Next step 5 is the validation of the model generation process. If the (working) model meets the criterion for a satisfactory model then the analyst can proceed to determine if the model is sufficiently robust, so that when extended beyond the Sample dataset used, the model retains it predictive power. In the modeling process validation stage the analyst is presented with a means to determine the validity of the process used to generate the model.

Figure 25A:
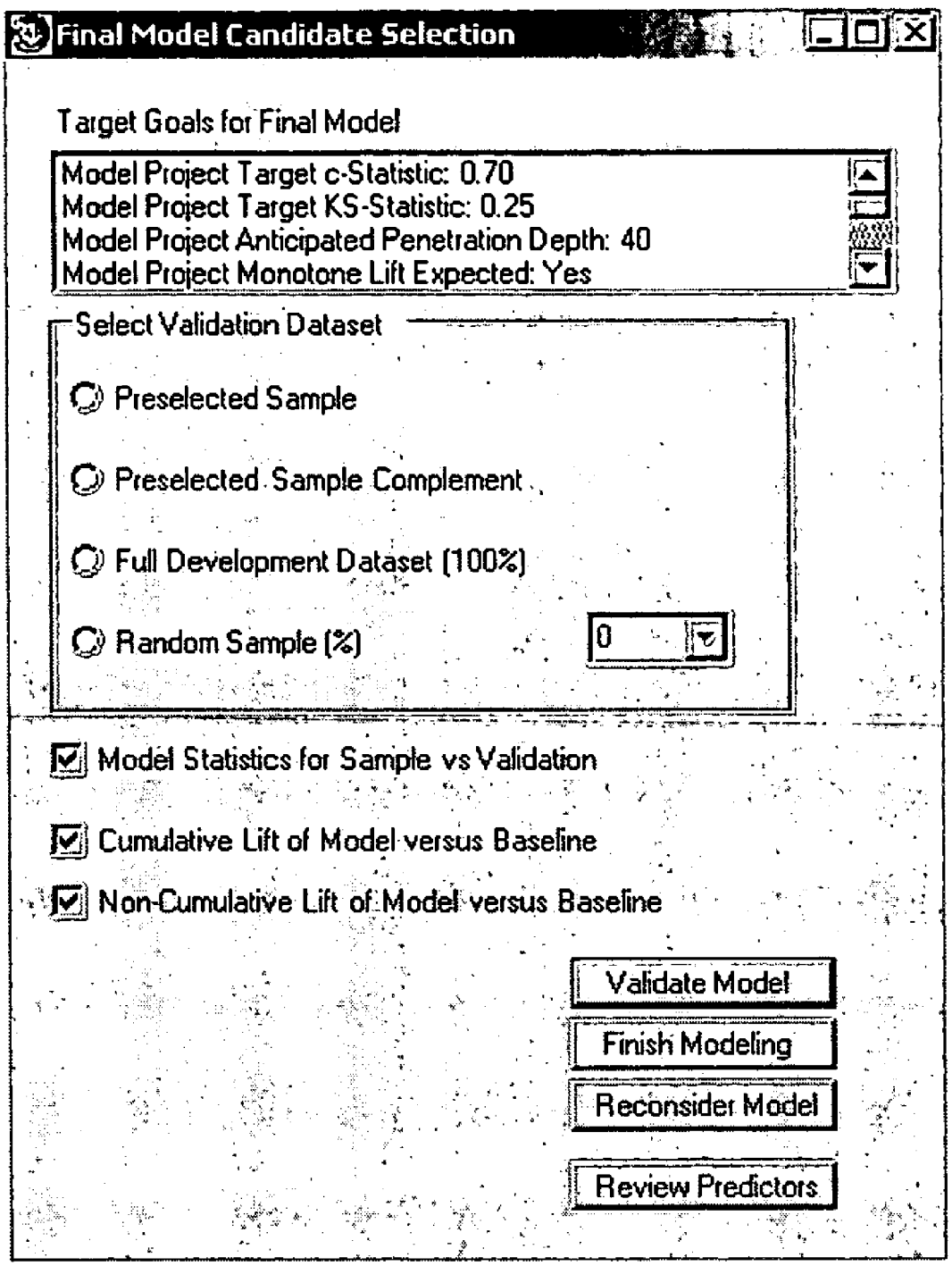
FIGS. 25a, 25B, and 25C are an exemplary graphical user representation of a gains chart and some statistical results comparison of a predictive model developed from a sample dataset and an application of the same model to a validation dataset.

The analyst is presented with a final model candidate selection dialog as shown in FIG. 25A. Similar to the sample selection process, the analyst picks a validation dataset The complement of the sample set, hold-out set gives the most statistically unbiased single estimate of the robustness of the candidate model; however, using cross-validation techniques, sets selected by resampling, although optimistically biased, give a more accurate estimate of the variability of robustness. In addition there is a default set of tests for robustness and validation that can be augmented.

Validating the model generation process involves a comparison of the proposed model candidate features to the initial entry information on the development dataset and the targeted values of the key features together with a validation of the candidate using the hold-out validation dataset as shown in FIG. 25A.

Figure 25B:
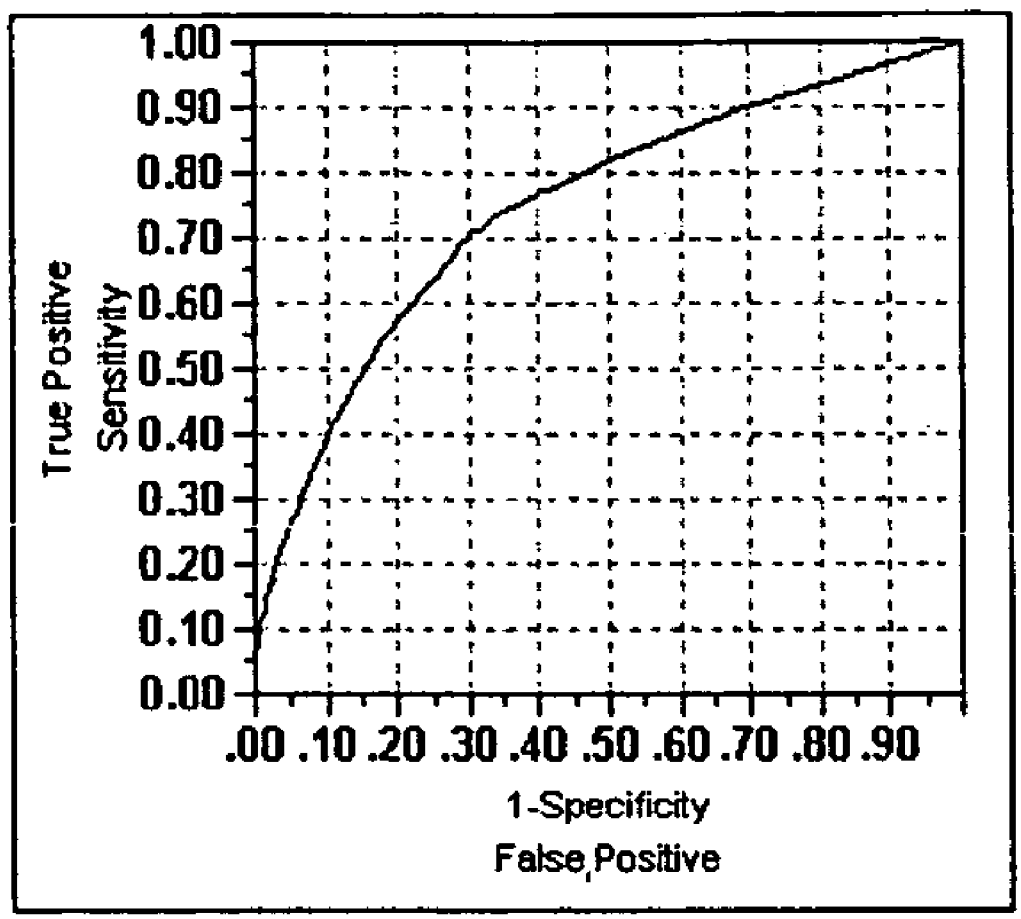

Clicking on the validate button executes the mandatory and optional tests as shown in FIGS. 25A and 25B. The user reviews the final model candidate selection checkboxes, and then clicks on the compare button to initiate the comparison of the model candidate using the sample dataset and the validation dataset as shown in FIG. 25B.

After the comparison process completes with all three checkboxes selected, three links to the results are displayed as shown in FIG. 25A.

Figure 25C:
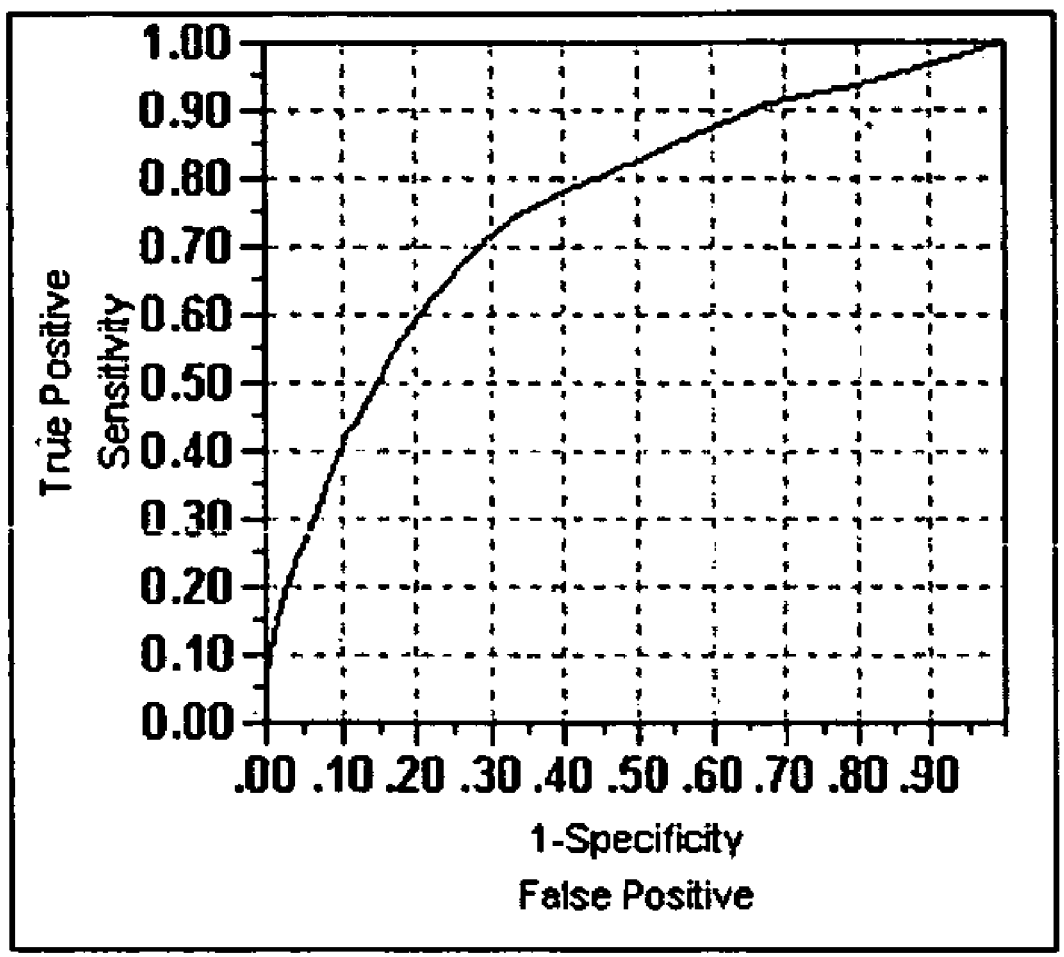

Clicking on the comparative model statistics button compares the concordance (area under ROC Curve) for both the sample dataset and the validation dataset as shown in FIGS. 25B and 25C.

Comparison of Model for Sample and Validation Datasets

The concordance statistic (c) [area under curve] of the validation dataset is less than that of the sample dataset but still exceeds the lower bound of 0.70. Clicking on the cumulative lift chart button displays the gains relative to those of an average random sample. Both the validation and sample cumulative lift are similar. Clicking on the non-cumulative lift button show similar performance Both the sample and validation lifts are similar and drop monotonically. After reviewing the results generated by clicking on the compare button, there are decision options to consider as shown in FIG. 25A.

If the candidate model does not generalize sufficiently well or fails to meet other criteria, the model method can be reconsidered by clicking on the reconsider model button, or the set of predictor variables can be reconsidered and edited by clicking on the review predictors button.

On the other hand, if, as in the illustrative example, the candidate model is acceptable as the final candidate model, the analyst clicks on the accept button to complete the model development process by regenerating the model using the full development set and then generating a report.

Final Model Candidate

The validation of the Candidate Model is the validation of the model development process for the development dataset under consideration. The Candidate Model was developed using just a subset of the full development dataset. Validation of the model development process for that development dataset enables the analyst to apply the same process to the full dataset with a resulting increase in accuracy and predictive power. To complete the model development process the full development dataset is subjected to the same process, resulting in a final candidate model and that model is applied to the sample dataset and to the validation dataset with the final candidate model equation and the results displayed in a report.

Report Generation

Figure 26:
FIG. 26 shows an exemplary graphical user interface to a summary report of a model project.

The model project report summarizes the description and goals entered when the project was initiated together with the results of statistical and graphical tests performed in the course of developing a model and the model equation to be used for scoring as shown in FIG. 26. Now the accepted final candidate model can be deployed to score a prospect list or develop insights about the customer base.

List Scoring

Prior to processing a prospect list, there are certain tests to be performed to make certain that the model is appropriately matched to the incoming list. There may be recodings of the variables in the incoming list, e.g., household income in dollars rather than thousands of dollars, but such modifications are easily accommodated. More substantially, the model may be based on aged data so the scores are less than optimally predictive. Depending on the circumstances, one or more tests shown above may need to be carried out. Clicking on the compare button launches the computation of the tests selected resulting in up to four hyperlinks.

Activating the compare file variable statistics hyperlink displays the following. In this side-by-side comparison, the two datasets have comparable patterns of average variable values and standard deviations for the key predictor variables indicating that scoring should be robust. As the charts demonstrate the variables in the development file and in the target scoring file display similar responses across deciles, which indicates that the development dataset is representative. As a third comparison, the distributions of the score computed by the model can be viewed in terms of comparative scores distributions The score distributions are equivalent so the final model can be committed to scoring the input list and producing the scored list. The scores can be assigned to predefined deciles, either from norms or from the development dataset.

Customer Insight

FIGS. 27A through 27D are an exemplary graphical user representation of a model project insight interactive dialog showing hyperlinks to a target profile and corresponding chart of key factors; exemplary graphical user representation of a model project insight chart showing target and non-target contributions for two key factors.

Good models can be used to gain insight into the customer base to efficiently target products to a given market. By clicking on the insight button, the analyst launches the customer insight module shown in FIG. 27A.

Figure 27A:
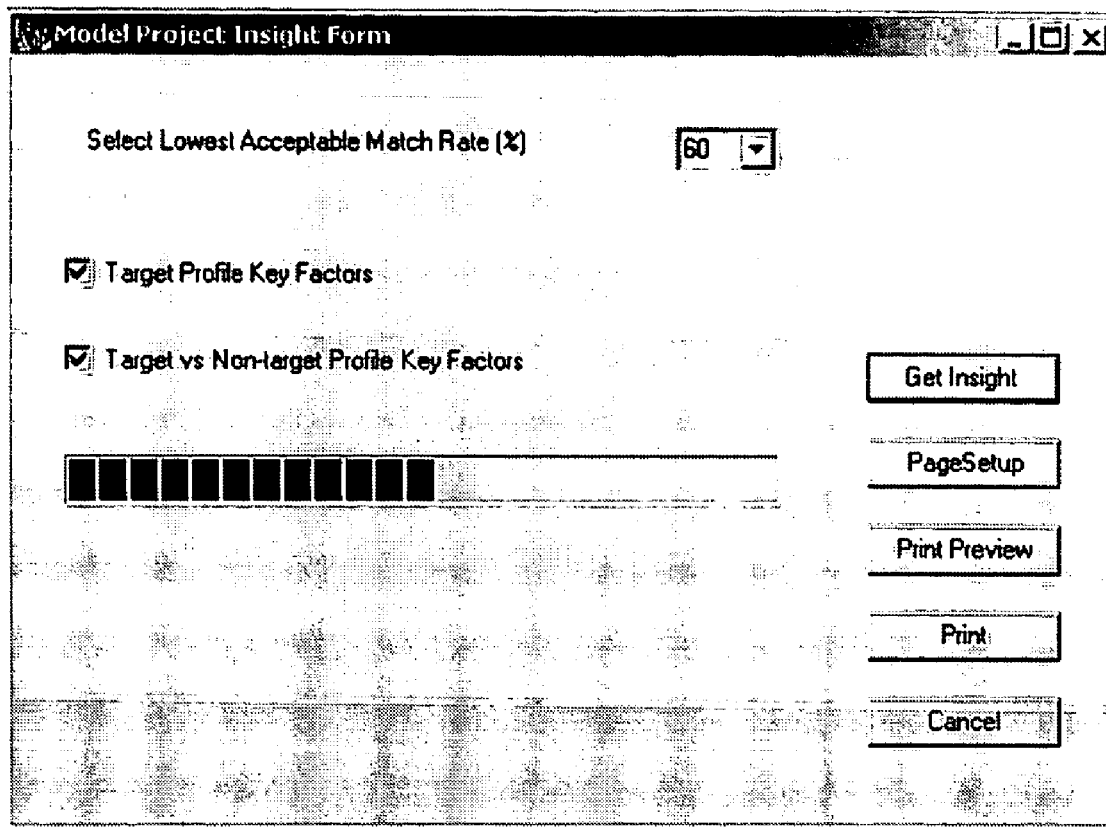
FIGS. 27A, 27B, 27C, and 27D are an exemplary graphical user representation of a model project insight interactive dialog showing hyperlinks to a target profile and corresponding chart of key factors; and an exemplary graphical user representation of a model project insight chart showing target and non-target contributions for two key factors.
Figure 27B:
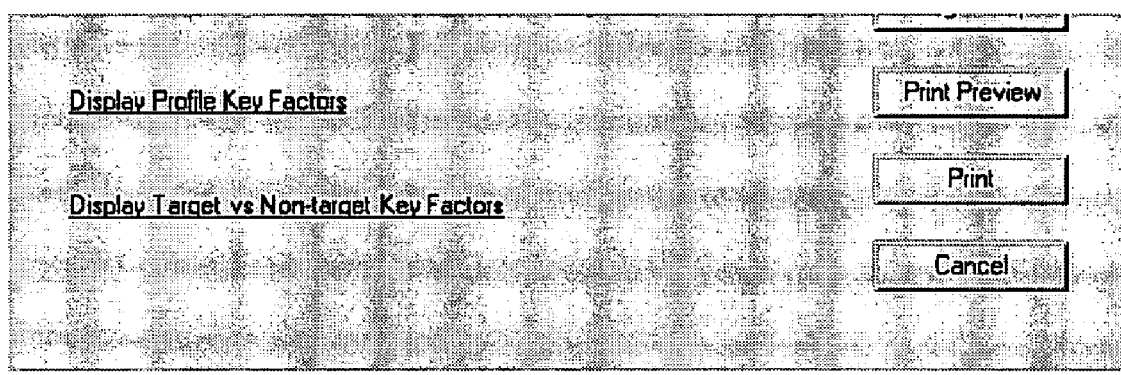
Figures 27C, 27D:

Such an analysis is most useful when the predictor variables are highly populated. For the goal of constructing a predictive model, a cut-off, by default set to 5%, was imposed to filter out sparsely populated variables. However, promotional marketing imposes a higher cut-off, typically 50% or more. After setting the lowest acceptable match rate drop-down list, selecting on the analyses needed, then clicking on the get insight button, the model generation platform generates two types of results as shown in FIG. 27B:

Clicking on the display profile key factors hyperlink, displays in rank order the key predictor variables as shown in FIG. 27C. Such key variables can be particularly enlightening when examined across products or in detail as shown in FIG. 27D.

The customer insight module benefits from the construction of an appropriate model but can operate as well on a subset of the variables, for example, those representing demographics alone. Typically, transaction variables are stronger predictors but for some campaign, e.g., a cross-sell, demographics may be the most appropriate to gain insight into clone populations.

Analyst Creates a New Model from a Template

In this scenario, next step 1 is to import a new dataset. The analyst opens an existing model project, then selects import dataset and chooses a dataset requiring the same type of model, e.g., a later phase of a marketing campaign, and uses the same data dictionary as shown earlier.

Next step 2 is a repopulation of the datasets. The model generation platform repopulates the sample and validation datasets, updates the model project entries including a new (default) model project name, and progresses through the modeling process to the modeling results display of FIG. 26.

Analyst Completes Model from Previously Saved Model

In this scenario, next step 1 is the prediction method. The analyst opens an existing model project that has been previously saved as a work in progress. The model generation platform repopulates the sample and validation dataset partitions, the subsets of predictor and excluded variables including any transformed variables as shown in FIG. 19. The analyst can then select the prediction method to use for model completion.

Analyst Revises Completed Model

In this scenario, next step 1 is the prediction method. The analyst opens an existing model that had been finalized which then forces a save under a different name. The goal is to improve on the model or import a new dataset using the final model as template. The model generation platform repopulates the sample and validation dataset partitions, the subsets of predictor and excluded variables including any transformed variables, executes the previously selected prediction method and the final tests and displays the results (FIG. 25). The analyst can then reject the final model and re-analyze the model starting with prediction method/import dataset.

Next step 2 is combined models. For particular distributions of targets in the dataset, a single model may not be optimal. A combined model, e.g., one optimal for the low deciles and a second model for the top deciles is the solution to such a challenging situation.

The model generation platform is designed to develop a finished model, document the development, and provide statistical and graphical reports of that development. The goal is to automate the majority of steps in statistical manipulations letting the analyst decide what criteria to apply, e.g., cut-off level to reduce the dimensionality of a dataset, and then judge the sufficiency of the results to determine progression toward validation of the model development process and the production of a final candidate model. A major design target is to make completion of the final model as fast and efficient as practical.

Accordingly, in view of the above; the model generation platform 10 illustrated in FIG. 1 and described herein is readily implemented using data and information available to software engineers that are skilled in the art, and the disclosure herein is adequate and provides sufficient information to permit one skilled in the art to practice the present invention.

Other implementations are also within the scope of the following claims. For example, variations in the identity and the sequence of the steps, choice points, and action points described above are possible. Other user interface approaches and elements may be used. The mathematical underpinnings of the system may be different than those described in the examples. The system can be applied to a variety of modeling projects other than customer behavior in a consumer or business market. In the context of customer behavior, as it applies to consumer and business markets, the platform can be applied to all stages of the customer lifecycle from customer acquisition, through customer development, to customer retention. The role of these applications may be to predict, monitor, or compare behavior, and the intent of the applications may be to elicit, monitor, reinforce or change a behavior. The platform may also be applied to assess a population of individuals, for example, to forecast trends or the magnitude of a future outcome stemming from the population. In another example, the platform may be applied to calculate a population's economic value, credit standing, or orientation toward a designated area of interest.

The distribution of the functions and components need not be as shown, but can instead be distributed over any number of computers or networks. Additionally, although we use the terms client and server, any given program may be capable of acting as either a client or server; our use of these terms may refer only to the role being performed by the program for a particular connection, rather than to the program's capabilities in general.

Seven other applications being filed on the same day as this one and which share a common detailed description, are incorporated by reference.

The invention claimed is:

1. A machine-based method comprising
receiving historical multi-dimensional data representing multiple variables,
transforming the variables into one or more predictive variables, including Bayesian renormalized variables,
the transforming of the variables into the Bayesian renormalized variables comprising adjusting a response frequency associated with a variable by a Bayesian analysis based on a priori response frequency associated with the variable, and
the adjusting of the response frequency associated with a variable comprising associating the variable with a weight to regress the response frequency toward a mean response frequency,
adjusting a population of variables to represent interaction effects exhibited by the historical data, the population of variables being selected from the multiple variables for use in generating a predictive model, at least some of the multiple variables being excluded from the selected population of variables, the interaction effects including interactions of at least some excluded variables with each other and with variables in the selected population of variables, and
using the adjusted population of variables that are transformed in generating the predictive model for use in interacting with a commercial system.

2. The method of claim 1 wherein the interaction effects also include stages of main effect interactions.

3. The method of claim 1 in which the predictive model predicts behavior of a current customer with respect to retention of a current service or product of a vendor.

4. The method of claim 1 in which the predictive model predicts behavior of a current customer with respect to risk of asserting claims, loan payment or prepayment to a vendor.

5. The method of claim 1 in which the predictive model predicts behavior of a current customer with respect to usage of a current service or product of a vendor.

6. The method of claim 1 also including enabling a user to reconstruct a sequence of choices involved in the creation of the predictive model.

7. The method of claim 1, further comprising enabling a user to interactively manage a sequence of steps for adjusting the population of variables through a graphical user interface, the sequence of steps including at least two or more steps, and the graphical user interface including an activation portion, which upon activation, enables the user to revisit at least one of the steps.

8. The method of claim 1 in which the predictive model predicts behavior of prospective or current customers of a vendor with respect to products or services offered by the vendor.

9. The method of claim 1 in which the predictive model predicts behavior of a prospective or current customer with respect to purchase of a product or service of a vendor.

10. The method of claim 7 in which the predictive model predicts behavior of a current customer with respect to retention of a current service or product of a vendor.

11. The method of claim 7 in which the predictive model predicts behavior of a current customer with respect to risk of asserting claims, loan payment or prepayment to a vendor.

12. The method of claim 7 in which the predictive model predicts behavior of a current customer with respect to usage of a current service or product of a vendor.

13. The method of claim 7 further comprising enabling the user to control staging of a sequence of model generation activities through the user interface.

14. The method of claim 1 in which the historical multi-dimensional data comprises transaction and communication data, demographic data, and econometric data.

15. The method of claim 1 further comprising providing access to a user to one or more steps used in generating the predictive model using a web service or Internet.

16. A computer system comprising:
a processor;
a memory; and
a storage device that stores a program for execution by the processor using the memory, the program comprising instructions for causing the processor to
receive historical multi-dimensional data representing multiple variables,
transform the variables into one or more predictive variables, including Bayesian renormalized variables, the transforming of the variables into the Bayesian renormalized variables comprising adjusting a response frequency associated with a variable by a Bayesian analysis based on a priori response frequency associated with the variable, and the adjusting of the response frequency associated with a variable comprising associating the variable with a weight to regress the response frequency toward a mean response frequency,
adjust a population of variables to represent interaction effects exhibited by the historical data, the population of variables being selected from the multiple variables for use in generating a predictive model, at least some of the multiple variables being excluded from the selected population of variables, the interaction effects including interactions of at least some excluded variables with each other and with variables in the selected population of variables, and
use the adjusted population of variables that are transformed in generating the predictive model for use in interacting with a commercial system.

17. The computer system of claim 16 in which the processor is accessible in a network.

18. The computer system of claim 17 in which the network comprises a web service or Internet.

* * * * *

UNITED STATES PATENT AND TRADEMARK OFFICE
CERTIFICATE OF CORRECTION

| | | |
|---|---|---|
| PATENT NO. | : 8,165,853 B2 | Page 1 of 1 |
| APPLICATION NO. | : 10/826949 | |
| DATED | : April 24, 2012 | |
| INVENTOR(S) | : Pinto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
Twenty-eighth Day of August, 2012

David J. Kappos
*Director of the United States Patent and Trademark Office*